United States Patent
Murphey et al.

(10) Patent No.: US 9,106,425 B2
(45) Date of Patent: *Aug. 11, 2015

(54) METHOD AND SYSTEM FOR RESTRICTING EXECUTION OF VIRTUAL APPLICATIONS TO A MANAGED PROCESS ENVIRONMENT

(71) Applicant: Code Systems Corporation, Seattle, WA (US)

(72) Inventors: C. Michael Murphey, Seattle, WA (US); Kenji C. Obata, Seattle, WA (US); Mark Jeremy Zeller, Seattle, WA (US); Stefan I. Larimore, Redmond, WA (US)

(73) Assignee: CODE SYSTEMS CORPORATION, Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/683,969

(22) Filed: Nov. 21, 2012

(65) Prior Publication Data

US 2013/0086386 A1    Apr. 4, 2013

Related U.S. Application Data

(62) Division of application No. 12/916,348, filed on Oct. 29, 2010.

(51) Int. Cl.
*G06F 21/00* (2013.01)
*G06F 7/04* (2006.01)
(Continued)

(52) U.S. Cl.
CPC . *H04L 9/32* (2013.01); *G06F 21/10* (2013.01)

(58) Field of Classification Search
CPC ......... G06F 21/31; G06F 21/10; H04L 63/08; H04L 63/083; H04L 9/32; H04L 21/6218
USPC ......... 713/181–183, 156, 158, 172, 173, 174; 726/1, 4, 12, 19, 21, 26; 707/65, 66, 707/67, 758, 823, 831; 709/225

See application file for complete search history.

(56) References Cited

U.S. PATENT DOCUMENTS 4,468,732 A    8/1984   Raver
5,437,031 A    7/1995   Kitami
(Continued)

OTHER PUBLICATIONS

Chapin, "Hive: Operating System Fault Containment for Shared-Memory Multiprocessors", Technical Report No. CSL-TR-97-712, Computer Systems Laboratory, Departments of Electrical Engineering and Computer Science, Stanford University, Jul. 1997, 156 pages.

(Continued)

*Primary Examiner* — Abu Sholeman
(74) *Attorney, Agent, or Firm* — Davis Wright Tremaine LLP; Heather M. Colburn

(57) ABSTRACT

Methods and systems for restricting the launch of virtual application files. In one embodiment, a launching application is signed with a digital signature. When the launching application launches a runtime engine and instructs it to execute an application file, the runtime engine determines whether an entity identifier associated with the launching application identifies an authorized entity. If the entity identifier identifies an authorized entity and the digital signature is valid, the runtime engine executes the application file. In another embodiment, a ticket is transmitted to the launching application along with an instruction to launch the application file. The ticket includes a digital signature and an expiration date. The launching application communicates the ticket to the runtime engine, which will execute the application file only if the digital signature is valid and a current date is not later than the expiration date.

10 Claims, 8 Drawing Sheets

(51) Int. Cl.
*H04L 9/32* (2006.01)
*G06F 21/10* (2013.01)

(56) References Cited

U.S. PATENT DOCUMENTS

| | | | |
|---|---|---|---|
| 5,495,610 A | 2/1996 | Shing et al. | |
| 5,860,068 A * | 1/1999 | Cook | 705/26.81 |
| 5,987,590 A | 11/1999 | Wing So | |
| 6,023,712 A | 2/2000 | Spear et al. | |
| 6,263,363 B1 | 7/2001 | Rosenblatt et al. | |
| 6,453,334 B1 | 9/2002 | Vinson et al. | |
| 6,493,733 B1 | 12/2002 | Pollack et al. | |
| 6,564,229 B1 | 5/2003 | Baweja et al. | |
| 6,675,216 B1 | 1/2004 | Quatrano et al. | |
| 6,704,808 B2 | 3/2004 | Kasamatsu et al. | |
| 6,757,893 B1 | 6/2004 | Haikin | |
| 7,028,295 B2 | 4/2006 | Li et al. | |
| 7,064,760 B2 | 6/2006 | Capin et al. | |
| 7,065,504 B2 * | 6/2006 | Sakuma et al. | 705/52 |
| 7,076,768 B2 | 7/2006 | Li et al. | |
| 7,089,259 B1 | 8/2006 | Kouznetsov et al. | |
| 7,096,253 B2 | 8/2006 | Vinson et al. | |
| 7,096,416 B1 | 8/2006 | Smith et al. | |
| 7,117,495 B2 | 10/2006 | Blaser et al. | |
| 7,130,073 B2 | 10/2006 | Kumar et al. | |
| 7,162,036 B2 * | 1/2007 | Rowe | 380/251 |
| 7,240,162 B2 | 7/2007 | De Vries | |
| 7,246,351 B2 | 7/2007 | Bloch et al. | |
| 7,272,613 B2 | 9/2007 | Sim et al. | |
| 7,337,298 B2 | 2/2008 | Kawachiya et al. | |
| 7,356,679 B1 | 4/2008 | Le et al. | |
| 7,360,097 B2 | 4/2008 | Rothstein | |
| 7,386,542 B2 | 6/2008 | Maybury et al. | |
| 7,437,371 B2 | 10/2008 | Rathakrishnan et al. | |
| 7,451,176 B2 | 11/2008 | Anders et al. | |
| 7,451,196 B1 | 11/2008 | de Vries et al. | |
| 7,499,991 B2 | 3/2009 | Johnson | |
| 7,523,116 B2 | 4/2009 | Yan | |
| 7,536,541 B2 | 5/2009 | Isaacson | |
| 7,577,751 B2 | 8/2009 | Vinson et al. | |
| 7,590,644 B2 | 9/2009 | Matsakis et al. | |
| 7,600,097 B1 | 10/2009 | Wright | |
| 7,623,673 B2 | 11/2009 | Mercier | |
| 7,634,477 B2 | 12/2009 | Hinshaw | |
| 7,634,772 B2 | 12/2009 | Parthasarathy et al. | |
| 7,664,367 B2 | 2/2010 | Suzuki | |
| 7,669,189 B1 | 2/2010 | Umamageswaran | |
| 7,689,825 B2 | 3/2010 | Iwamura | |
| 7,707,564 B2 | 4/2010 | Marvin et al. | |
| 7,743,407 B2 | 6/2010 | Sprigg et al. | |
| 7,752,442 B2 * | 7/2010 | Della-Libera et al. | 713/170 |
| 7,752,511 B2 | 7/2010 | Fulton et al. | |
| 7,761,503 B2 | 7/2010 | Dhawan et al. | |
| 7,797,748 B2 | 9/2010 | Zheng et al. | |
| 7,801,827 B2 * | 9/2010 | Bishop et al. | 705/67 |
| 7,831,047 B2 * | 11/2010 | Rowe | 380/251 |
| 7,836,299 B2 * | 11/2010 | England et al. | 713/162 |
| 7,840,961 B1 | 11/2010 | Weathersby | |
| 7,950,026 B1 | 5/2011 | Urbach | |
| 7,970,789 B1 | 6/2011 | Blaser et al. | |
| 7,971,032 B2 * | 6/2011 | Shattuck | 712/209 |
| 8,010,667 B2 | 8/2011 | Zhang et al. | |
| 8,065,675 B2 | 11/2011 | Strauss et al. | |
| 8,069,443 B2 | 11/2011 | Ackerman et al. | |
| 8,219,805 B1 | 7/2012 | Ie et al. | |
| 8,230,442 B2 | 7/2012 | Aho et al. | |
| 8,271,944 B2 | 9/2012 | Austin et al. | |
| 8,375,140 B2 | 2/2013 | Tippin et al. | |
| 8,387,006 B1 | 2/2013 | Taylor | |
| 8,429,248 B1 | 4/2013 | Ketrenos et al. | |
| 8,434,093 B2 | 4/2013 | Larimore et al. | |
| 8,468,175 B2 | 6/2013 | Obata | |
| 8,489,513 B2 * | 7/2013 | Bishop et al. | 705/67 |
| 8,510,734 B2 | 8/2013 | Criddle et al. | |
| 8,626,806 B2 | 1/2014 | Larimore et al. | |
| 8,677,345 B2 | 3/2014 | Choi et al. | |
| 8,719,898 B1 * | 5/2014 | Barton et al. | 726/1 |
| 8,763,009 B2 | 6/2014 | Degirmenci et al. | |
| 2001/0016905 A1 | 8/2001 | Kasamatsu et al. | |
| 2002/0029283 A1 | 3/2002 | Beckett et al. | |
| 2002/0032754 A1 | 3/2002 | Logston et al. | |
| 2002/0099951 A1 | 7/2002 | O'Connor | |
| 2002/0112078 A1 | 8/2002 | Yach | |
| 2002/0129129 A1 | 9/2002 | Bloch et al. | |
| 2002/0133491 A1 | 9/2002 | Sim et al. | |
| 2002/0161578 A1 | 10/2002 | Saidon et al. | |
| 2002/0162015 A1 | 10/2002 | Tang | |
| 2002/0174193 A1 | 11/2002 | Mikhalchuk | |
| 2003/0031176 A1 | 2/2003 | Sim et al. | |
| 2003/0051169 A1 | 3/2003 | Sprigg et al. | |
| 2004/0083474 A1 | 4/2004 | McKinlay et al. | |
| 2004/0128342 A1 | 7/2004 | Maes et al. | |
| 2004/0133444 A1 | 7/2004 | Defaix et al. | |
| 2004/0139315 A1 | 7/2004 | Tokutani et al. | |
| 2005/0132359 A1 | 6/2005 | McGuire et al. | |
| 2005/0198647 A1 | 9/2005 | Hipp et al. | |
| 2005/0262553 A1 | 11/2005 | Bialick et al. | |
| 2005/0273772 A1 | 12/2005 | Matsakis et al. | |
| 2006/0048136 A1 | 3/2006 | Vries et al. | |
| 2006/0053380 A1 | 3/2006 | Spataro et al. | |
| 2006/0074733 A1 | 4/2006 | Shukla et al. | |
| 2006/0075064 A1 | 4/2006 | Keohane et al. | |
| 2006/0085359 A1 * | 4/2006 | Kim | 705/65 |
| 2006/0123185 A1 | 6/2006 | de Vries et al. | |
| 2006/0168294 A1 | 7/2006 | de Vries et al. | |
| 2006/0218165 A1 | 9/2006 | Vries et al. | |
| 2006/0222203 A1 | 10/2006 | Mercier | |
| 2006/0230175 A1 | 10/2006 | de Vries et al. | |
| 2006/0242626 A1 | 10/2006 | Pham et al. | |
| 2006/0248442 A1 | 11/2006 | Rosenstein et al. | |
| 2006/0253535 A1 | 11/2006 | Betros et al. | |
| 2006/0256130 A1 | 11/2006 | Gonzalez | |
| 2006/0259585 A1 | 11/2006 | Keohane et al. | |
| 2007/0016721 A1 | 1/2007 | Gay | |
| 2007/0043943 A1 | 2/2007 | Peretti | |
| 2007/0078988 A1 | 4/2007 | Miloushev et al. | |
| 2007/0143704 A1 | 6/2007 | Laird-McConnell | |
| 2007/0168953 A1 | 7/2007 | Diez et al. | |
| 2007/0168965 A1 | 7/2007 | Zenz et al. | |
| 2007/0174824 A1 | 7/2007 | Relyea et al. | |
| 2007/0226798 A1 * | 9/2007 | Sibert | 726/22 |
| 2007/0234277 A1 | 10/2007 | Lei et al. | |
| 2007/0240155 A1 | 10/2007 | Shlomai | |
| 2007/0245331 A1 | 10/2007 | Daynes et al. | |
| 2007/0277102 A1 | 11/2007 | Kanzaki | |
| 2007/0294674 A1 | 12/2007 | Marilly et al. | |
| 2008/0010389 A1 | 1/2008 | Iwata | |
| 2008/0155171 A1 | 6/2008 | Jeong | |
| 2008/0163194 A1 | 7/2008 | Dias et al. | |
| 2008/0181230 A1 | 7/2008 | Hitt et al. | |
| 2008/0184135 A1 | 7/2008 | Washburn et al. | |
| 2008/0235680 A1 | 9/2008 | Strauss | |
| 2008/0275938 A1 | 11/2008 | Yach | |
| 2008/0281882 A1 | 11/2008 | Hachio et al. | |
| 2008/0294877 A1 | 11/2008 | Haga et al. | |
| 2008/0298219 A1 | 12/2008 | Yamagata et al. | |
| 2008/0301672 A1 | 12/2008 | Rao et al. | |
| 2009/0055542 A1 | 2/2009 | Zhao et al. | |
| 2009/0064086 A1 | 3/2009 | Faus et al. | |
| 2009/0076966 A1 * | 3/2009 | Bishop et al. | 705/67 |
| 2009/0077551 A1 | 3/2009 | Whiteley | |
| 2009/0077645 A1 * | 3/2009 | Kottahachchi | 726/9 |
| 2009/0110307 A1 | 4/2009 | Markowitz | |
| 2009/0132811 A1 * | 5/2009 | Koster et al. | 713/156 |
| 2009/0158432 A1 | 6/2009 | Zheng et al. | |
| 2009/0193057 A1 * | 7/2009 | Maes | 707/200 |
| 2009/0198358 A1 | 8/2009 | Logan et al. | |
| 2009/0199175 A1 | 8/2009 | Keller et al. | |
| 2009/0216811 A1 | 8/2009 | Manczak et al. | |
| 2009/0235158 A1 | 9/2009 | Rosenstein et al. | |
| 2009/0240663 A1 | 9/2009 | Plattner et al. | |
| 2009/0249071 A1 | 10/2009 | De Atley et al. | |
| 2009/0249324 A1 | 10/2009 | Brar et al. | |
| 2009/0300076 A1 | 12/2009 | Friedman et al. | |

(56) References Cited

U.S. PATENT DOCUMENTS

| | | | |
|---|---|---|---|
| 2009/0300151 A1 | 12/2009 | Friedman et al. | |
| 2009/0307351 A1* | 12/2009 | Raja et al. | 709/224 |
| 2009/0307763 A1 | 12/2009 | Rawlins et al. | |
| 2009/0313322 A1 | 12/2009 | Sheehan et al. | |
| 2009/0328030 A1 | 12/2009 | Fries | |
| 2010/0005291 A1 | 1/2010 | Hulten et al. | |
| 2010/0023640 A1 | 1/2010 | Vinson et al. | |
| 2010/0023934 A1 | 1/2010 | Sheehan et al. | |
| 2010/0023974 A1 | 1/2010 | Shiragaki et al. | |
| 2010/0037206 A1 | 2/2010 | Larimore et al. | |
| 2010/0037235 A1 | 2/2010 | Larimore et al. | |
| 2010/0077096 A1 | 3/2010 | Philip et al. | |
| 2010/0088448 A1 | 4/2010 | Min et al. | |
| 2010/0106804 A1 | 4/2010 | He et al. | |
| 2010/0107163 A1 | 4/2010 | Lee | |
| 2010/0121973 A1 | 5/2010 | Lobacheva et al. | |
| 2010/0131084 A1 | 5/2010 | Van Camp | |
| 2010/0138479 A1 | 6/2010 | Zhu | |
| 2010/0146590 A1 | 6/2010 | Jung | |
| 2010/0169790 A1* | 7/2010 | Vaughan et al. | 715/740 |
| 2010/0205604 A1 | 8/2010 | Brower et al. | |
| 2010/0241718 A1 | 9/2010 | Rasmussen et al. | |
| 2010/0250782 A1 | 9/2010 | Pratt et al. | |
| 2010/0281458 A1 | 11/2010 | Paladino et al. | |
| 2010/0306849 A1 | 12/2010 | Zheng et al. | |
| 2010/0318997 A1* | 12/2010 | Li et al. | 718/104 |
| 2010/0322523 A1 | 12/2010 | Mitsuhashi et al. | |
| 2010/0333085 A1 | 12/2010 | Criddle et al. | |
| 2011/0004840 A1 | 1/2011 | Feinberg et al. | |
| 2011/0078625 A1 | 3/2011 | Mumford et al. | |
| 2011/0106908 A1 | 5/2011 | Risku et al. | |
| 2011/0145428 A1 | 6/2011 | Wei et al. | |
| 2011/0145592 A1* | 6/2011 | Greiner | 713/189 |
| 2011/0145726 A1 | 6/2011 | Wei et al. | |
| 2011/0153437 A1* | 6/2011 | Archer et al. | 705/17 |
| 2011/0153975 A1 | 6/2011 | Accapadi et al. | |
| 2011/0173607 A1 | 7/2011 | Murphey et al. | |
| 2011/0179411 A1 | 7/2011 | Lederer | |
| 2011/0185013 A1 | 7/2011 | Obata et al. | |
| 2011/0185043 A1 | 7/2011 | Zeller et al. | |
| 2011/0191772 A1 | 8/2011 | Larimore et al. | |
| 2011/0246659 A1 | 10/2011 | Bouazizi | |
| 2011/0289513 A1 | 11/2011 | Degirmenci et al. | |
| 2012/0005237 A1 | 1/2012 | Obata | |
| 2012/0005244 A1 | 1/2012 | Obata et al. | |
| 2012/0005246 A1 | 1/2012 | Obata | |
| 2012/0005309 A1 | 1/2012 | Obata et al. | |
| 2012/0005310 A1 | 1/2012 | Obata | |
| 2012/0005334 A1* | 1/2012 | Raja et al. | 709/224 |
| 2012/0005674 A1 | 1/2012 | Larimore et al. | |
| 2012/0096071 A1 | 4/2012 | Murphey et al. | |
| 2012/0110337 A1* | 5/2012 | Murphey et al. | 713/182 |
| 2012/0125993 A1* | 5/2012 | Thiele et al. | 235/375 |
| 2012/0150986 A1 | 6/2012 | Piccinini et al. | |
| 2012/0155358 A1* | 6/2012 | Hao et al. | 370/312 |
| 2012/0203807 A1 | 8/2012 | Larimore et al. | |
| 2012/0203808 A1 | 8/2012 | Larimore et al. | |
| 2013/0086386 A1* | 4/2013 | Murphey et al. | 713/176 |
| 2013/0132525 A1 | 5/2013 | Tippin | |
| 2013/0139250 A1* | 5/2013 | Lo et al. | 726/19 |
| 2013/0191882 A1* | 7/2013 | Jolfaei | 726/4 |
| 2013/0247070 A1* | 9/2013 | Larimore et al. | 719/312 |
| 2013/0271456 A1* | 10/2013 | Haswell et al. | 345/420 |
| 2013/0275886 A1* | 10/2013 | Haswell et al. | 715/757 |
| 2013/0283362 A1* | 10/2013 | Kress et al. | 726/7 |
| 2014/0298401 A1* | 10/2014 | Batson et al. | 726/1 |

OTHER PUBLICATIONS

Final Office Action received in U.S. Appl. No. 12/188,155, dated Aug. 31, 2012, 22 pages.
Final Office Action received in U.S. Appl. No. 12/695,107, dated Oct. 30, 2012, 16 pages.
Final Office Action received in U.S. Appl. No. 12/876,085, dated Nov. 14, 2012, 12 pages.
Information Disclosure Statement Transmittal Letter filed herewith on Nov. 21, 2012, 2 pages.
Non-Final Office Action received in U.S. Appl. No. 12/695,107, dated Dec. 8, 2011, 17 pages.
Non-Final Office Action received in U.S. Appl. No. 12/188,155, dated Dec. 19, 2011, 19 pages.
Non-Final Office Action received in U.S. Appl. No. 12/876,085, dated Mar. 8, 2012, 9 pages.
Non-Final Office Action received in U.S. Appl. No. 12/188,161, dated May 10, 2012, 14 pages.
Non-Final Office Action received in U.S. Appl. No. 12/879,956, dated Jun. 6, 2012, 11 pages.
Non-Final Office Action received in U.S. Appl. No. 13/171,258, dated Jul. 13, 2012, 15 pages.
Non-Final Office Action received in U.S. Appl. No. 12/876,082, dated Oct. 22, 2012, 18 pages.
Non-Final Office Action received in U.S. Appl. No. 12/916,348, dated Oct. 24, 2012, 24 pages.
Non-Final Office Action received in U.S. Appl. No. 12/685,576, dated Nov. 2, 2012, 8 pages.
Non-Final Office Action received in U.S. Appl. No. 12/906,904, dated Nov. 13, 2012, 19 pages.
Notice of Allowance received in U.S. Appl. No. 12/877,918, dated Mar. 19, 2012, 25 pages.
Notice of Allowance received in U.S. Appl. No. 12/877,918, dated Jun. 21, 2012, 31 pages.
Notice of Allowance received in U.S. Appl. No. 12/877,918, dated Aug. 16, 2012, 22 pages.
Notice of Allowance received in U.S. Appl. No. 12/877,918, dated Sep. 26, 2012, 24 pages.
Notice of Allowance received in U.S. Appl. No. 12/697,029, dated Aug. 17, 2012, 21 pages.
Notice of Allowance received in U.S. Appl. No. 12/188,161, dated Oct. 10, 2012, 13 pages.
Restriction Requirement received in U.S. Appl. No. 12/188,161, dated Dec. 20, 2011, 5 pages.
Restriction Requirement received in U.S. Appl. No. 12/876,085, dated Jan. 27, 2012, 6 pages.
Thinstall, "Application Virtualization: A Technical Overview of the Thinstall Application Virtualization Platform," Thinstall (Nov. 26, 2006 (retrieved from the Internet Archive Wayback Machine on Dec. 2, 2011 at http://web.archive.org/web/20061124201334/http://thinstall.com/products/respurces_geth.php?aid=5), 12 pages.
Final Office Action issued in U.S. Appl. No. 13/449,140, dated Jul. 22, 2013.
Non-Final Office Action issued in U.S. Appl. No. 13/449,140, dated Dec. 7, 2012.
Non-Final Rejection issued in U.S. Appl. No. 13/449,140, dated Nov. 15, 2013.
Notice of Allowance issued in U.S. Appl. No. 13/449,049, dated Apr. 29, 2013.
Final Office Action issued in U.S. Appl. No. 13/171,258, dated Jan. 11, 2013.
Final Office Action issued in U.S. Appl. No. 12/879,956, dated Nov. 23, 2012.
Non-Final Office Action issued in U.S. Appl. No. 13/449,049, dated Dec. 13, 2012.
Non-Final Office Action issued in U.S. Appl. No. 12/876,085, dated Mar. 18, 2013.
Non-Final Office Action issued in U.S. Appl. No. 12/188,155, dated Feb. 28, 2013.
Non-Final Office Action issued in U.S. Appl. No. 13/088,265, dated Dec. 12, 2012.
Notice of Allowance issued in U.S. Appl. No. 12/188,161, dated Dec. 4, 2012.
Notice of Allowance issued in U.S. Appl. No. 12/188,161, dated Jan. 4, 2013.
Notice of Allowance issued in U.S. Appl. No. 12/879,956, dated Feb. 21, 2013.
Notice of Allowance issued in U.S. Appl. No. 12/876,082, dated May 10, 2013.
Notice of Allowance issued in U.S. Appl. No. 12/877,918, dated Apr. 26, 2013.

(56) References Cited

OTHER PUBLICATIONS

Restriction Requirement issued in U.S. Appl. No. 12/705,492, dated Mar. 15, 2013.
Susitaival, et al., "Analyizing the File Availability and Download Time in a P2P File Sharing System," IEEE, 2007, pp. 88-95.
Final Office Action issued in U.S. Appl. No. 12/685,576, dated Jan. 30, 2014.
Final Office Action issued in U.S. Appl. No. 12/916,348, dated Jul. 11, 2013.
Final Office Action issued in U.S. Appl. No. 13/088,265, dated Jul. 25, 2013.
Final Rejection issued in U.S. Appl. No. 12/906,904, dated Jul. 31, 2013.
Non-Final Office Action issued in U.S. Appl. No. 12/879,947, dated Jul. 10, 2013.
Non-Final Office Action issued in U.S. Appl. No. 13/171,258, dated Apr. 29, 2014.
Non-Final Office Action issued in U.S. Appl. No. 13/683,969, dated Feb. 28, 2014.
Non-Final Office Action issued in U.S. Appl. No. 13/918,067, dated Feb. 27, 2014.
Non-Final Office Action issued in U.S. Appl. No. 12/685,576, dated Jun. 20, 2013.
Notice of Allowance issued in U.S. Appl. No. 12/188,155, dated Oct. 25, 2013.
Notice of Allowance issued in U.S. Appl. No. 12/188,155, dated Feb. 13, 2014.
Notice of Allowance issued in U.S. Appl. No. 12/876,082, dated Feb. 28, 2014.
Notice of Allowance issued in U.S. Appl. No. 12/876,085, dated Mar. 6, 2014.
Notice of Allowance issued in U.S. Appl. No. 12/876,085, dated Nov. 14, 2013.
Notice of Allowance issued in U.S. Appl. No. 12/877,918, dated Dec. 13, 2013.
Notice of Allowance issued in U.S. Appl. No. 12/877,918, dated Aug. 20, 2013.
Notice of Allowance issued in U.S. Appl. No. 12/879,947, dated Jan. 27, 2014.
Notice of Allowance issued in U.S. Appl. No. 12/916,348, dated Nov. 13, 2013.
Notice of Allowance issued in U.S. Appl. No. 13/088,265, dated Feb. 14, 2014.
Notice of Allowance issued in U.S. Appl. No. 13/866,682, dated Jun. 25, 2014.
Notice of Allowance issued in U.S. Appl. No. 12/188,155, dated Jun. 25, 2013.
Notice of Allowance issued in U.S. Appl. No. 13/449,049, dated Aug. 13, 2013.
Notice of Allowance issued in U.S. Appl. No. 12/697,029, dated May 24, 2013.
Hung, et al., "Using Behavior Templates to Design Remotely Executing Agents for Wireless Clients," 2004 4th Workshop on Applications and Services in Wireless Networks (ASWN), (2004).
Notice of Allowance issued in U.S. Appl. No. 13/449,140, dated Aug. 11, 2014.
Restriction Requirement issued in U.S. Appl. No. 12/705,492, dated Aug. 6, 2014.
Non-Final Office Action issued in U.S. Appl. No. 12/916,348, dated Sep. 4, 2014.
Notice of Allowance issued in U.S. Appl. No. 12/695,107, dated Sep. 17, 2014.
Notice of Allowance issued in U.S. Appl. No. 12/685,576, dated Sep. 23, 2014.
Notice of Allowance issued in U.S. Appl. No. 12/705,492, dated Sep. 26, 2014.
Notice of Allowance issued in U.S. Appl. No. 12/876,082, dated Sep. 26, 2014.
Notice of Allowance issued in U.S. Appl. No. 12/697,029, dated Oct. 3, 2014.
Notice of Allowance issued in U.S. Appl. No. 12/906,904, dated Oct. 8, 2014.
Zheng et al., "SODON: A High Availability Multi-Source Content Distribution Overlay," IEEE, 2004, pp. 87-92.
Notice of Allowance received in U.S. Appl. No. 13/866,682, dated Oct. 28, 2014.
Non-Final Office Action received in U.S. Appl. No. 14/297,506, dated Nov. 6, 2014.
Notice of Allowance received in U.S. Appl. No. 13/918,067, dated Nov. 17, 2014.
Notice of Allowance received in U.S. Appl. No. 13/449,140, dated Nov. 20, 2014.
Notice of Allowance received in U.S. Appl. No. 12/695,107, dated Jan. 5, 2015.
Final Office Action received in U.S. Appl. No. 13/171,258, dated Jan. 23, 2015.
Notice of Allowance received in U.S. Appl. No. 12/697,029, dated Jan. 30, 2015.
Notice of Allowance received in U.S. Appl. No. 13/866,682, dated Feb. 17, 2015.
Notice of Allowance received in U.S. Appl. No. 12/876,082, dated Feb. 20, 2015.
Non-Final Office Action received in U.S. Appl. No. 14/297,468, dated Feb. 26, 2015.
Notice of Allowance received in U.S. Appl. No. 13/918,067, dated Mar. 2, 2015.
Non-Final Office Action received in U.S. Appl. No. 14/262,511, dated Apr. 27, 2015.

* cited by examiner

METHOD AND SYSTEM FOR RESTRICTING EXECUTION OF VIRTUAL APPLICATIONS TO A MANAGED PROCESS ENVIRONMENT

CROSS REFERENCE TO RELATED APPLICATION(S)

This application is a divisional of U.S. patent application Ser. No. 12/916,348, filed Oct. 29, 2010.

BACKGROUND OF THE INVENTION

1. Field of the Invention

The present invention is directed generally to methods and systems for restricting application execution to authorized users and/or authorized launching applications.

2. Description of the Related Art

A virtual application is a virtual machine image pre-configured with all of the files, registry data, settings, components, runtimes, and other dependencies required for a specific application to execute immediately and without installation on a host computing device. The virtual application is partially isolated from other applications implemented on a host computing device and partially isolated from an underlying host operating system installed and executing on the host computing device. The virtual application is encapsulated from the host operating system by a virtual runtime environment, which includes a virtual operating system, that receives operations performed by the virtualized application and redirects them to one or more virtualized locations (e.g., a virtual filesystem, virtual registry, and the like).

Thus, the virtual application may be conceptualized as including two components: a virtualization runtime and a virtual application configuration. The virtualization runtime implements the virtual runtime environment, which implements various operating system application programming interfaces ("APIs") in such a way that allows the executing virtual application to access and interact with items that may not be present on the host computer. The virtual application configuration includes data necessary to implement the virtual application within the virtualization runtime.

The virtual application is stored in and implemented by one or more data files and/or executable files. Depending upon the implementation details, the one or more data files and/or executable files storing and implementing the virtual application may include blocks of data corresponding to each application file of a natively installed version of the application. Herein, these blocks of data will be referred to as "virtual application files." The one or more data files and/or executable files storing and implementing the virtual application also include configuration information.

The data files and/or executable files are configured to execute within a virtual runtime environment that is provided at least in part by the virtual operating system. When the virtual application is executed within the virtual runtime engine, the configuration information is used to configure the virtual operating system to execute the virtual application. For example, the configuration information may contain information related to the virtual application files, virtual registry entries, environment variables, services, and the like. The virtual operating system is configured to communicate with the host operating system as required to execute the virtual application on the host computing device.

Virtual applications are highly portable. Therefore, a need exists for methods and systems that prevent unauthorized distribution and/or execution of virtual applications. The present application provides these and other advantages as will be apparent from the following detailed description and accompanying figures.

BRIEF DESCRIPTION OF THE SEVERAL VIEWS OF THE DRAWING(S)

DETAILED DESCRIPTION OF THE INVENTION

Figure 1:
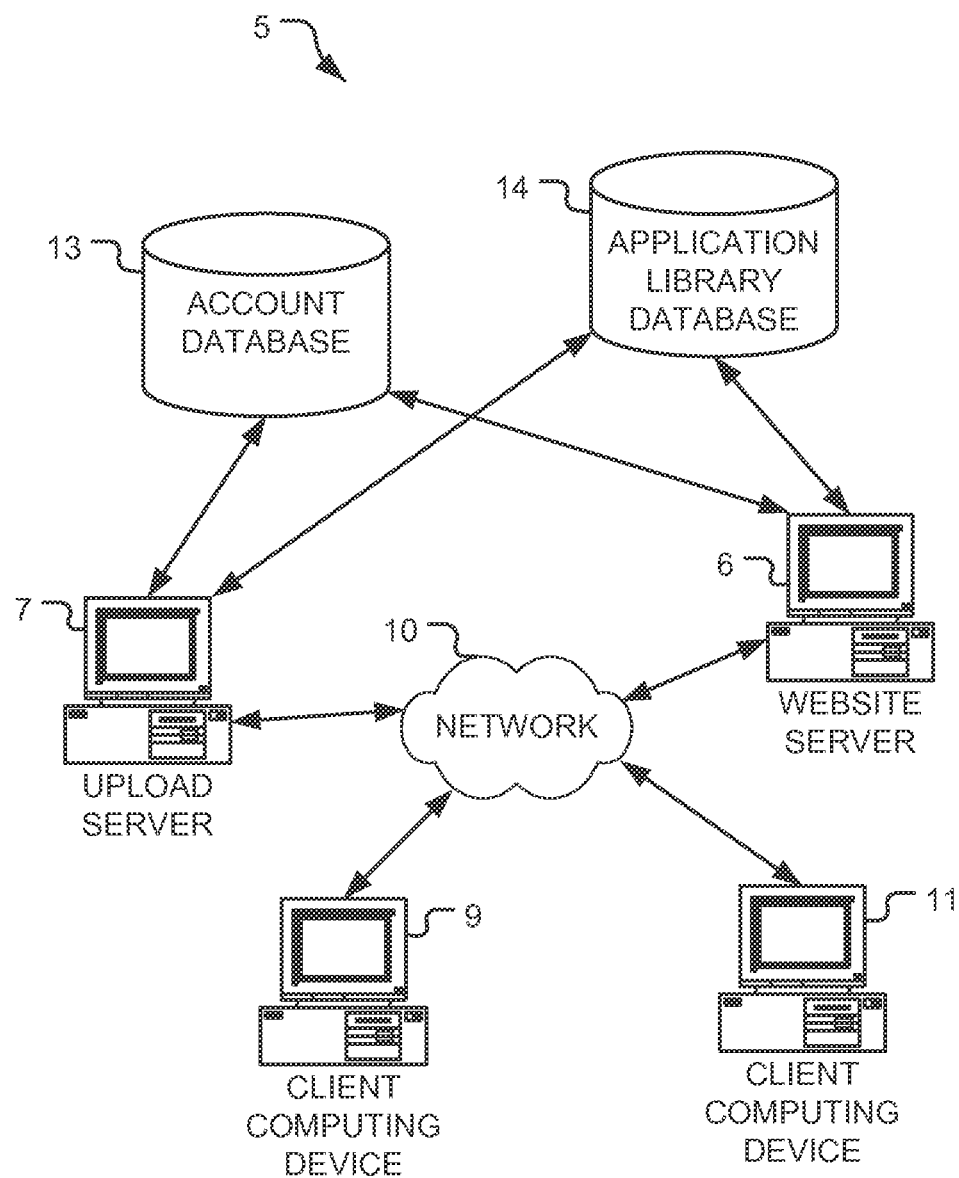
FIG. 1 is a diagram of a system for publishing an executable virtualized application file and/or an xlayer file from a first client computing device to a first server computing device (functioning as an upload server) over a network.

FIG. 1 illustrates a system 5 for publishing applications (e.g., virtual applications) residing on a client computing device 9 to a server computing device 7 (e.g., a web server) for distribution thereby, to other computing devices (e.g., a client computing device 11) over a network 10 (e.g., the Internet, a WAN, a LAN, a combination thereof, and the like). One or more additional computing devices, such as a second server computing device 6 may also be coupled to the network 10. In the embodiment illustrated, the server computing devices 6 and 7 are each implemented as a web server. The server computing device 7 may be connected to one or more additional computing devices directly and/or over the network 10.

In the embodiment illustrated, the server computing device 7 functions as an upload server receiving the application to be published from the client computing device 9. The server computing device 7 copies the application to the server computing device 6, which functions as a website server. The server computing device 6 generates a website 190 (see FIG. 6) from which the application may be downloaded and/or executed (e.g., by the client computing device 11). Optionally, execution of the downloaded application may be profiled to generate one or more transcripts that may be used to generate a streaming model.

The server computing devices 6 and 7 are each connected to an Account Database 13 and an Application Library Database 14. While illustrated as separate databases, as is apparent to those of ordinary skill in the art, the Account and Application Library Databases 13 and 14 may be implemented in the same database. Further, the Account and Application Library Databases 13 and 14 may be implemented on one or more computing devices (not shown).

The Account Database 13 stores information related to each user account. The Application Library Database 14 stores information related to each application uploaded to the server computing device 7.

The system 5 may be used to distribute application files (e.g., virtualized application files). Further, the system 5 may be used to track application versions and make different versions of a particular application available to users.

The system 5 is described in detail in U.S. patent application Ser. No. 12/906,904, filed on Oct. 18, 2010, entitled Method and System for Publishing Virtual Applications to a Web Server, which is incorporated herein by reference in its entirety.

A diagram of hardware and an operating environment in conjunction with which implementations of the server computing device 6, the server computing device 7, the client computing device 9, the client computing device 11, the Account Database 13, the Application Library Database 14, and the network 10 may be practiced is provided in FIG. 10 and described below.

Figure 2:
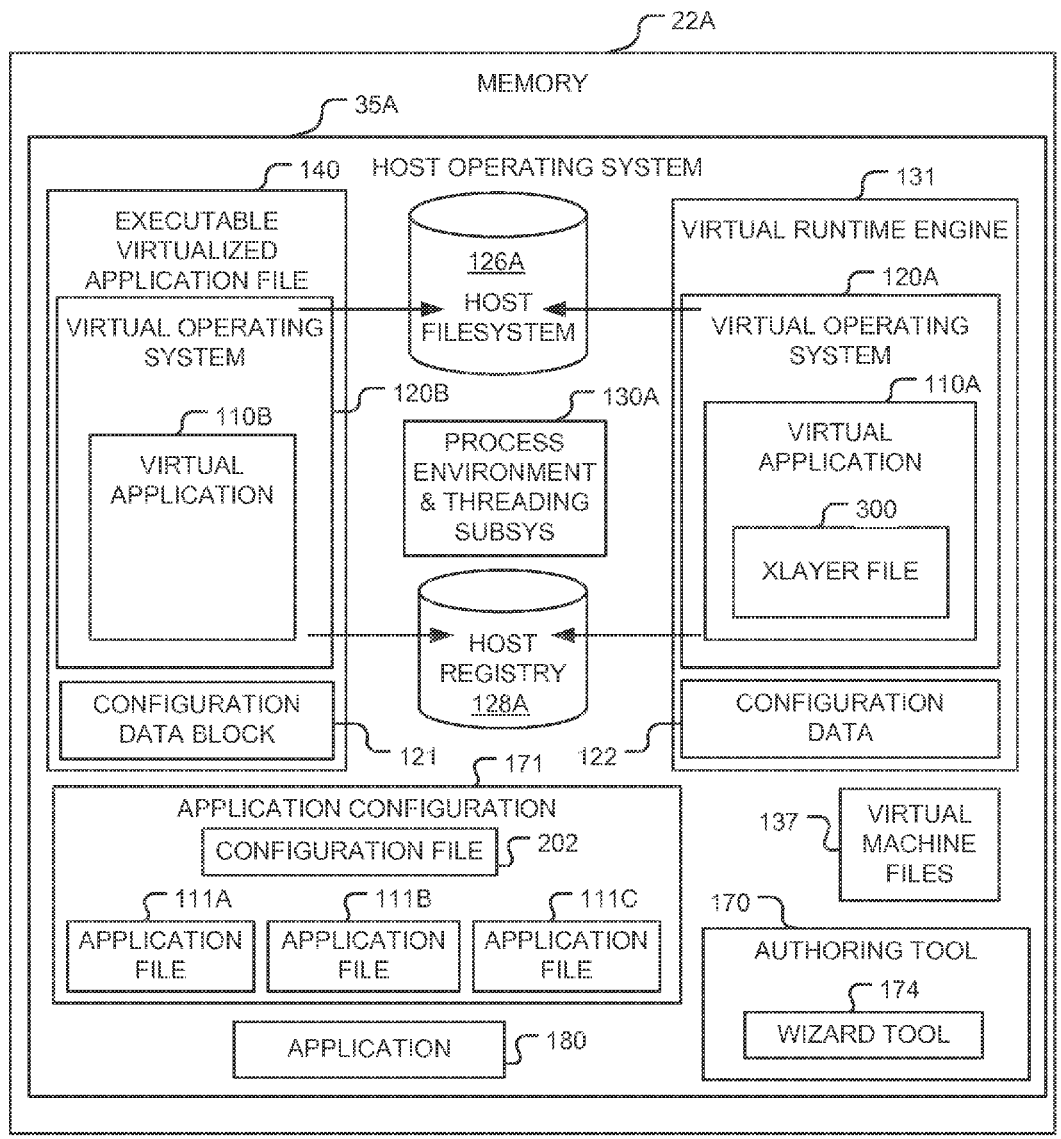
FIG. 2 is an illustration of a conceptualization of software components stored in a system memory of the first client computing device of FIG. 1.

FIG. 2 illustrates a system memory 22A of the client computing device 9 (illustrated in FIG. 1) storing a conventional operating system 35A, that like most operating systems, includes a filesystem 126A, a registry 128A, and a process environment and threading subsystems component 130A. As explained above, applications may be transferred from the client computing device 9 to the server computing device 7 for distribution thereby.

A virtual application may be implemented as an executable virtualized application file 140 or an xlayer file 300 configured to execute within a virtualized environment provided by a virtual machine (or a virtual runtime engine 131). The executable virtualized application file 140 and the xlayer file 300 may each be characterized as being a virtualized application file. FIG. 2 illustrates a virtual application 110A implemented by the execution of the xlayer file 300 by the virtual runtime engine 131. FIG. 2 also illustrates a virtual application 110B implemented by the execution of the executable virtualized application file 140. The virtual runtime engine 131 may execute within an operating system shell process.

U.S. patent application Ser. No. 12/697,029, filed on Mar. 31, 2010, entitled Method and System for Improving Startup Performance and Interoperability of a Virtual Application, which is incorporated herein by reference in its entirety, describes a file format that may be used to configure the xlayer file 300. The virtualized application file 140 and the xlayer file 300 may each be implemented as a binary file.

The system memory 22A may store one or more files implementing one or more virtual runtime engines. By way of a non-limiting example, the system memory 22A may include a plurality of virtual machine executable files 137 that when executed, each implements a different virtual machine. For example, each of the virtual machine executable files 137 may implement a different version of the same virtual machine. The virtual machine executable files 137 may be executed individually. When executed, a virtual machine executable file implements a virtualized environment.

A natively installed version of an application 180 is configured to execute within a runtime environment provided at least in part by the host operating system 35A. Typically, to execute within the runtime environment provided at least in part by the host operating system 35A, the natively installed version of the application 180 modifies the configuration and settings of the host operating system 35A. For example, the natively installed version may install dynamic link libraries or change registry settings of the host operating system 35A. In contrast, a virtual version of the same application may be executed on the host operating system 35A without installation on the host operating system 35A. On the other hand, the virtual applications 110A and 110E do not modify the configuration or settings of the host operating system 35A. For example, to execute the virtual applications 110A and 110B, dynamic link libraries ("dlls"), data files, registry settings, environment variables, and the like need not be modified on to the host operating system 35A.

The virtualized application file 140 may include components necessary to implement a virtual runtime environment including a virtual operating system 120B configured to execute in the operating system 35A of the client computing device 9 (illustrated in FIG. 1). Similarly, the virtual runtime engine 131 includes components necessary to implement a virtual runtime environment including a virtual operating system 120A configured to execute in the operating system 35A of the client computing device 9 (illustrated in FIG. 1). The virtual operating systems 120A and 120B are configured to intercept calls to the host operating system 35A and route them to corresponding components of the virtual operating systems 120A and 120B, respectively. The virtual operating systems 120A and 120B may also route some requests and actions to the host operating system 35A and 35B, respectively, for processing.

In the embodiment illustrated in FIG. 2, the virtualized application file 140 and the xlayer file 300 each implement a virtualized version of the application 180. U.S. patent application Ser. No. 12/188,155, filed on Aug. 7, 2008, U.S. patent application Ser. No. 12/188,161 filed on Aug. 7, 2008, and U.S. patent application Ser. No. 12/685,576 filed on Jan. 11, 2010, all of which are incorporated herein by reference in their entireties, disclose systems that may be used to create and configure the virtualized application file 140 and/or the xlayer file 300. As described in greater detail in U.S. patent application Ser. Nos. 12/188,155, 12/188,161, and 12/685,576, a virtual application constructor or authoring tool 170 may use an application template that includes copies of files, such as a configuration file 202, application files 111A-1110, and the like, to configure the virtualized application file 140 or the xlayer file 300. However, the template is not a requirement. Instead, the authoring tool 170 needs only the configuration file 202 and copies of any applications files 111A-1110 (necessary for a natively installed version of the application to execute) to build the virtualized application file 140 or the xlayer file 300. The applications files 111A-111C and the configuration file 202 are referred to collectively as an application configuration 171. The authoring tool 170 may combine the application configuration 171 and the components of the virtual runtime engine (e.g., the virtual operating system 120) to construct or build the executable virtualized application file 140. Alternatively, the authoring tool 170 may use the application configuration 171 to build the xlayer file 300. As described in U.S. patent application Ser. Nos. 12/188,155 and 12/188,161, the application configuration 171 may be created using a snapshot technique or other process (e.g., manually specifying the application configuration 171) operable to capture the application configuration 171 based on the application 180. The authoring tool 170 may include a wizard 174 described in U.S. patent application Ser. No. 12/906,904.

As explained in U.S. patent application Ser. Nos. 12/188,155 and 12/697,029, the virtualized application file 140 and the xlayer file 300 each store configuration information. A component of the virtual runtime engine (e.g., the virtual runtime engine 131) referred to as a "reader" reads the configuration information and uses that data to configure the virtual runtime environment. The configuration information may be stored in a configuration data block 121 of the virtualized application file 140 or within configuration data 122 stored by the xlayer file 300. Among other settings, the configuration information includes a digital rights management ("DRM") indicator (e.g., a Boolean value). As explained in U.S. patent application Ser. No. 12/188,155, a virtualized application file may be created using an application template that includes a virtual application configuration file (e.g., a file having the extension "xappl"). By way of a non-limiting example, the configuration information including the DRM indicator may be stored in the virtual application configuration file used to create the virtualized application file.

As mentioned above, the server computing device 7 transfers or copies the uploaded file 192 (see FIG. 3) to the server computing device 6. The server computing device 7 (which functions as an upload server) is further operable to communicate with the Account Database 13 for the purposes of obtaining and storing information related to the user account associated with the uploaded file 192 (see FIG. 3). The server computing device 7 is also operable to communicate with the Application Library Database 14 for the purposes of obtaining and storing information related to the uploaded file 192 (see FIG. 3) and the virtual application(s) associated therewith.

Figure 3:
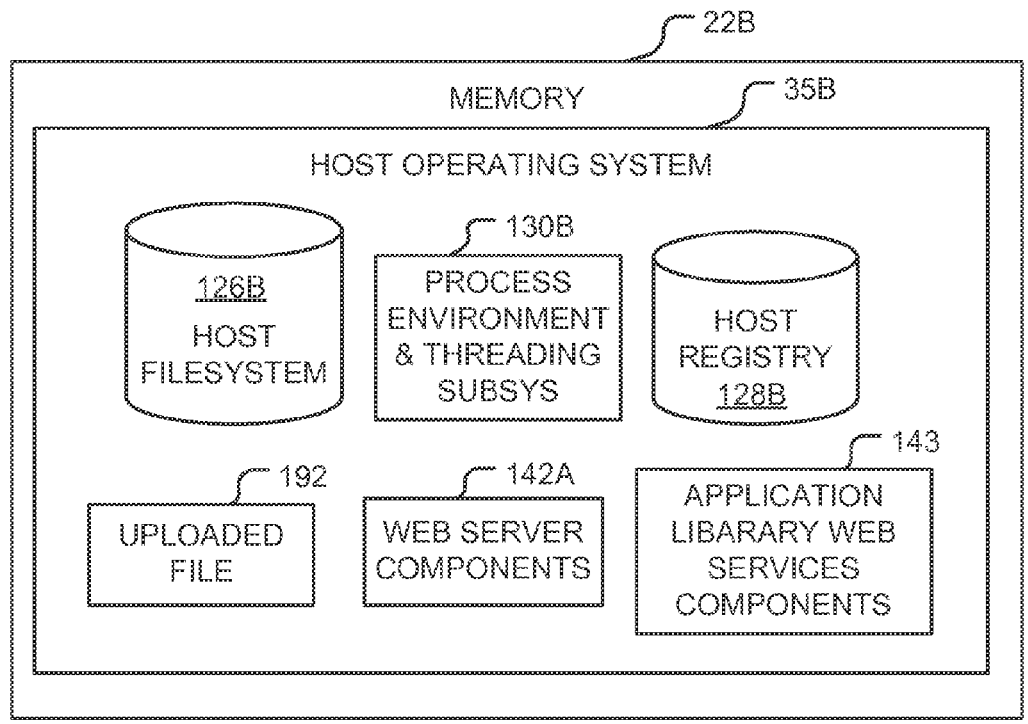
FIG. 3 is an illustration of a conceptualization of software components stored in memory and executing on the first server computing device of FIG. 1.

The server computing device 6 is operable to generate the website 190 (see FIG. 6) including a link for each of the uploaded files (e.g., the uploaded file 192 illustrated in FIG. 3). Other computing devices (e.g., the client computing device 11 illustrated in FIG. 1) may navigate to the website 190 (see FIG. 6) and select the links to thereby download and/or execute the uploaded files.

While illustrated as being outside the filesystem 126A, those of ordinary skill in the art appreciate that the executable virtualized application file 140, the xlayer file 300, the application configuration 171, the application 180, the virtual machine files 137, and the authoring tool 170 may be conceptualized as being within the filesystem 126A.

FIG. 3 illustrates a system memory 22B of the server computing device 7 (illustrated in FIG. 1). The system memory 22B stores a conventional host operating system 35B that, like most operating systems, includes a host filesystem 126B, a host registry 128B, and a process environment and threading subsystems component 130B. In the embodiment illustrated, the system memory 22B stores web server components 142A configured to implement a web server. However, the server computing device 7 need not generate a website (such as the website 190 illustrated in FIG. 6). Instead, in the embodiment illustrated, the web server components 142A need only provide web services. The wizard 174 (see FIG. 2) of the authoring tool 170 is configured to communicate with the web server components 142A (e.g., via Hypertext Transfer Protocol (HTTP)). By way of non-limiting examples, the web server components 142A may implement Internet Information Services ("IIS") provided by Microsoft Corporation, Apache, and the like.

The system memory 22B also stores application library web services components 143 configured to communicate with the Account and Application Library Databases 13 and 14 (e.g., using Structured Query Language ("SQL")) and perform other functions described below. The wizard 174 communicates with the web server components 142A, which access the application library web services components 143 requested by the wizard 174. While illustrated as being outside the filesystem 126B, those of ordinary skill in the art appreciate that the uploaded file 192, the web server components 142A, and the application library web services components 143 may be conceptualized as being within the filesystem 126B.

Figure 4:
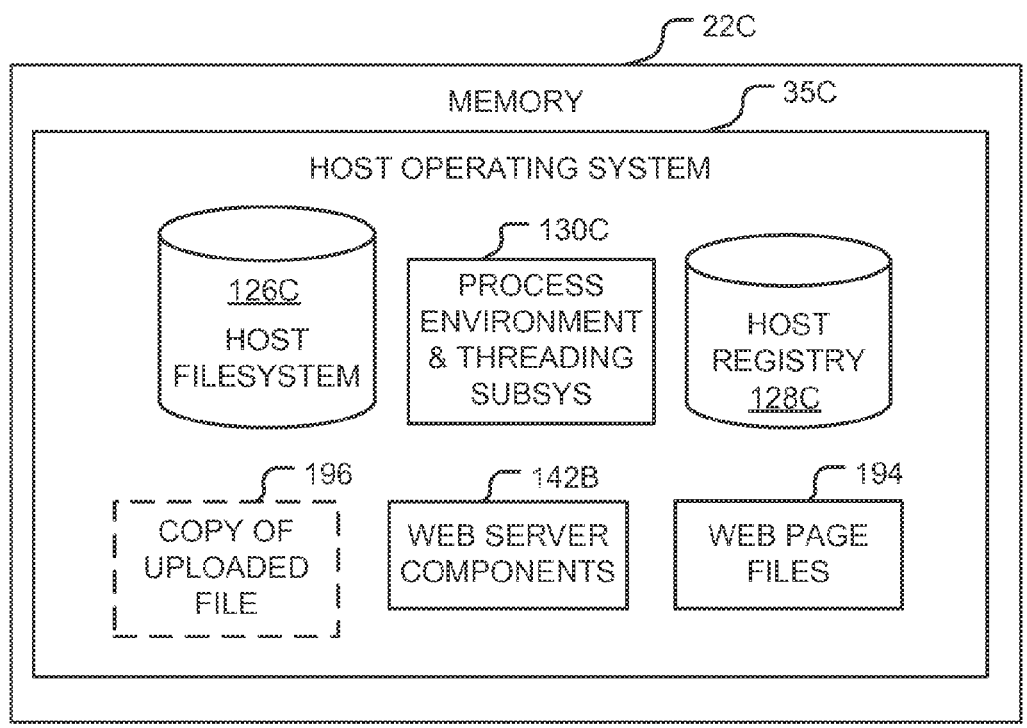
FIG. 4 is an illustration of a conceptualization of software components stored in memory and executing on a second server computing device (functioning as a website server) of FIG. 1 configured to generate a website for displaying a link to a copy of the published file.

FIG. 4 illustrates a system memory 22C of the server computing device 6 (illustrated in FIG. 1). The system memory 22C stores a conventional host operating system 350 that, like most operating systems, includes a host filesystem 126O, a host registry 128C, and a process environment and threading subsystems component 130C. In the embodiment illustrated, the system memory 220 stores web server components 142B configured to implement a web server. The web server components 142B are configured to serve web page files 194 to thereby generate the website 190 (see FIG. 6) having a link a copy of the uploaded file 196. Optionally, the copy of the uploaded file 196 may be stored in the system memory 22C. However, this is not a requirement and the link may direct a user to the uploaded file 192 (see FIG. 3) stored on the server computing device 7 (illustrated in FIG. 1) or a copy of the uploaded file on a different server computing device. By way of non-limiting examples, the web server components 142B may implement Internet Information Services ("IIS") provided by Microsoft Corporation, Apache, and the like. While illustrated as being outside the filesystem 126C, those of ordinary skill in the art appreciate that the web server components 142B, the optional copy of the uploaded file 196, and the web page files 194 may be conceptualized as being within the filesystem 1260.

Figure 5:
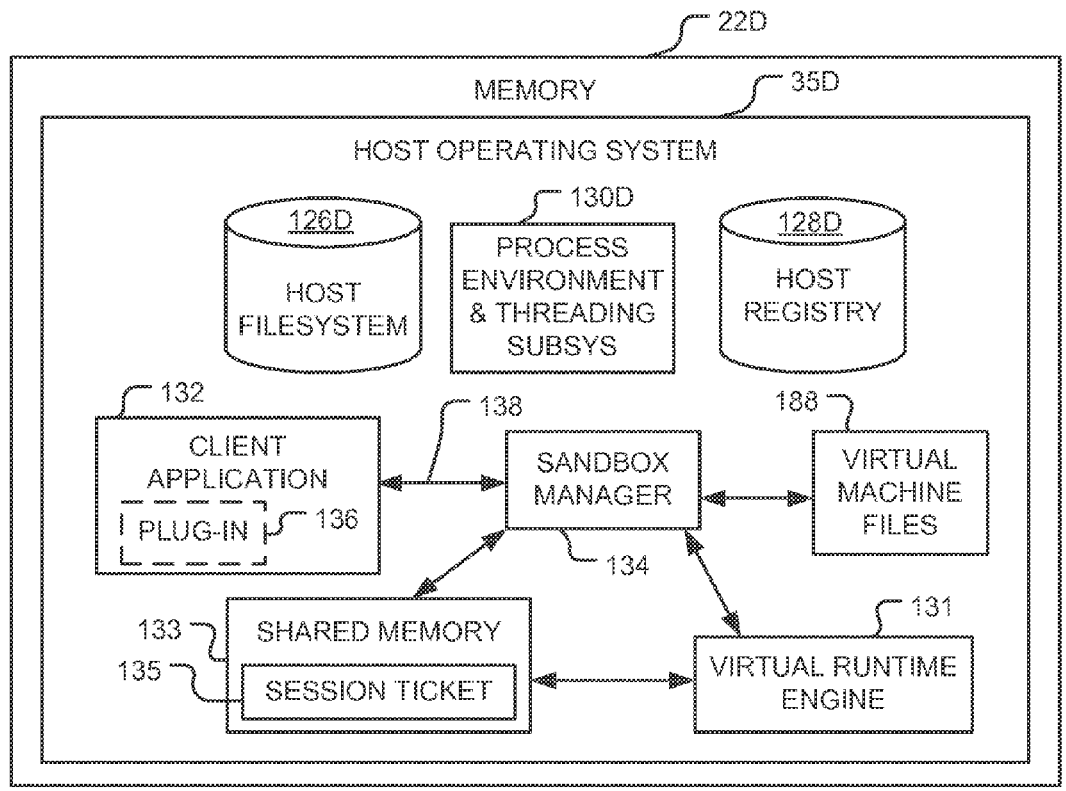
FIG. 5 is an illustration of a conceptualization of software components stored in memory and executing on a second client computing device of FIG. 1 configured to download, execute, and/or profile execution of a copy of the published file.

FIG. 5 illustrates a system memory 22D of the client computing device 11 (illustrated in FIG. 1) storing a conventional operating system 35D, that like most operating systems, includes a filesystem 1260, a registry 128D, and a process environment and threading subsystems component 130D. A Client Application 132 (e.g., a web browser application) and a Sandbox Manager 134 are also stored in the system memory 220 of the client computing device 11 (illustrated in FIG. 1). Optionally, the Client Application 132 may include a plug-in 136 or similar application. In the embodiment illustrated, the Client Application 132 communicates with the Sandbox Manager 134 over a communication link 138 that may be implemented as a Transmission Control Protocol ("TCP") connection using TOP protocol. Each virtualized application file being transferred and/or executed may be identified by a unique session identifier ("SessionId"). The Sandbox Manager 134 and Client Application 132 are described in detail in U.S. patent application Ser. No. 12/695,107, filed on Jan. 27, 2010, and U.S. patent application Ser. No. 12/705,492, filed on Feb. 12, 2010 both titled System for Downloading and Executing a Virtual Application. U.S. patent application Ser. Nos. 12/695,107 and 12/705,492 are both incorporated herein by reference in their entirety.

As described in U.S. patent application Ser. No. 12/879,956, filed Sep. 10, 2010, titled Method and System for Building a Streaming Model, and incorporated herein by reference in its entirety, the Sandbox Manager 134 and the virtual runtime engine 131 may both have read/write access to a block of shared memory 133 that may be used to send settings and state information between the Sandbox Manager 134 and the virtual runtime engine 131. Thus, the Sandbox Manager 134 and the virtual runtime engine 131 may both access the block of shared memory 133 as a means of communicating with one another.

Virtual machine files 188 are also stored in the system memory 22D. The virtual machine files 188 may be substantially identical to the virtual machine files 137 stored in the system memory 22A (see FIG. 2). Execution of a virtual machine file (e.g., one of the virtual machine files 188) may be initiated by the Sandbox Manager 134 using a command including a parameter (e.g., a file path) identifying a virtualized application file to execute. The virtualized application file may include a downloaded copy of the xlayer file 300 or a portion thereof sufficient to initiate execution. In response to receiving the parameter, the virtual machine executable file executes the identified virtualized application file inside the virtualized environment implemented by the virtual machine executable file.

Together the Client Application 132 and the Sandbox Manager 134 may download and/or execute a virtual application. In embodiments in which the Client Application 132 includes the plug-in 136, a user may click on a link or otherwise select an application file displayed on the website 190 (see FIG. 6) for download and/or execution. The website 190 (or selection of the application file) launches the plug-in 136, which established the communication link 138 with the Sandbox Manager 134. The Sandbox Manager 134 identifies which of the virtual machine files 188 is configured to execute the virtual runtime engine 131 that is configured to execute the application file selected by the user and launches the virtual machine file identified. The Sandbox Manager 134 determines whether the application is to be executed in profile mode. The selection mechanism (e.g., a link clicked by the user) may include a parameter value (e.g., a flag) that indicates whether execution of the application file is to be profiled. If the application is to be executed in profile mode, the Sandbox Manager 134 instructs the virtual runtime engine 131 to operate in profile mode. As the virtual runtime engine 131 executes the application file in profile mode, the Sandbox Manager 134 collects profile information (supplied by the virtual runtime engine 131) and stores it in one or more transcripts that may be used to profile a virtual application's access to the underlying original application file (e.g., the xlayer file 300).

A profiling process and process of generating a streaming model from one or more transcript files are described in greater detail in U.S. patent application Ser. No. 12/877,918, filed on Sep. 8, 2010, titled Method and System for Building and Distributing Application Profiles via the Internet, which is incorporated herein by reference in its entirety.

The system 5 (see FIG. 1) may be characterized as implementing an application library that includes the uploaded files (e.g., the uploaded file 192 illustrated in FIG. 3, the copy of the uploaded file 196 illustrated in FIG. 4, and the like), Application Library Web Services (implemented by the application library web services components 143 illustrated in FIG. 3), and the Account and Application Library Databases 13 and 14 (see FIG. 1).

As mentioned above, the server computing device 6 is configured to generate the website 190 (see FIG. 6), which may include a link for at least a portion of the files identified in the application library. Other computing devices (e.g., the client computing device 11 illustrated in FIG. 1) may navigate to the website 190 (see FIG. 6) and select the links to thereby download and/or execute the uploaded files. However, it may be desirable to restrict execution of the virtualized application files before and/or after they are downloaded. Execution of the virtualized application files may be restricted in one or more of the following ways: (1) restricting which applications may launch the virtualized application files; and (2) issuing session tickets that are required to execute the virtualized application files.

Restricting Launch Capability to Specific Applications

Public-key cryptography uses asymmetric key algorithms to create a mathematically related pair of keys referred to as a private key and a public key. However, the private key cannot be generated from the public key. The private key is generally kept secret and the public key is generally made available to others.

The private and public keys may be used to authenticate messages or data. For example, the private key may be used to create a digital signature of a message or data that can be verified using the public key. In this manner, anyone with the public key can verify the message or data was created by an entity associated with the public key. The keys can also be used for security purposes. For example, a message or data may be encrypted using the public key (which may decrypted using the private key) to prevent someone other than the entity associated with the private key from decrypting the message. The entity may generate the public and private keys.

A Certificate Authority (e.g., Verisign, Inc.) issues a public key certificate (commonly referred to as a digital certificate) that binds the public key with identity information using a digital signature. The digital signature may be created using a private key associated with the Certificate Authority that can be verified using a public key (stored in a public key certificate) associated with the Certificate Authority.

A public key certificate issued by the Certificate Authority can be used to verify that the public key belongs to the entity. For example, third parties can verify the signature provided by the Certificate Authority using the public key certificate associated with the Certificate Authority. Thus, the digital signature provided by the Certificate Authority that issued the public key certificate attests that the identity information and the public key included in the public key certificate are associated with one another. In other words, the public key certificate associated with the Certificate Authority may be used to endorse the public key and identity information included in the public key certificate associated with the entity.

Figure 7:
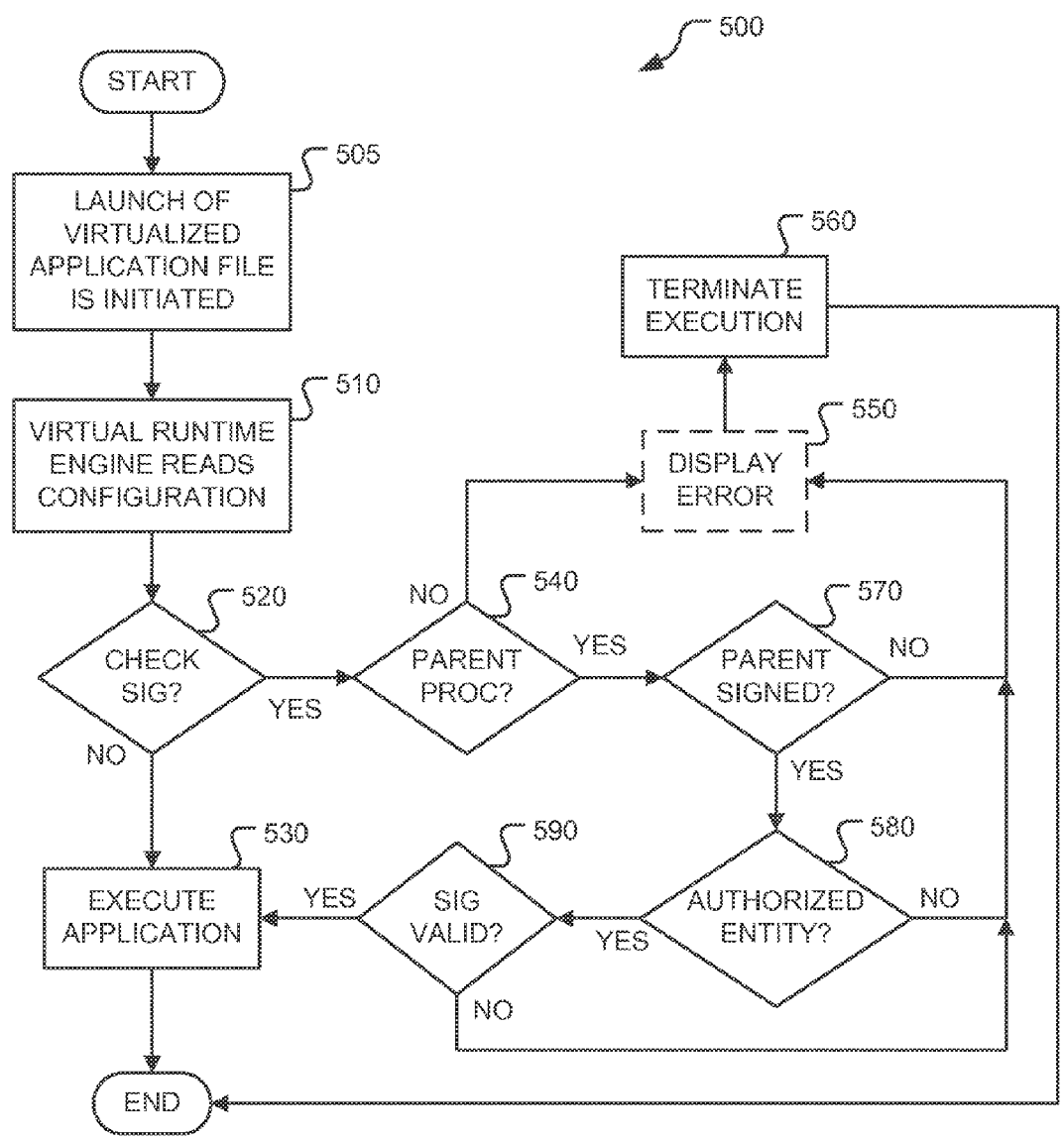
FIG. 7 is a flow diagram of a method of restricting execution of the published file to an authorized launching application, such as a Sandbox Manager illustrated in FIG. 5.

Turning to FIG. 7, in a method 500, the private and public keys are associated with an authorized entity tasked with providing, at least in part, a managed distribution environment for a virtualized application file (e.g., the xlayer file 300 illustrated in FIG. 2). A managed distribution environment includes one or more applications (e.g., the Sandbox Manager 134 illustrated in FIG. 5) that, among other things, control the launching of virtual applications. In the method 500, a public key certificate including the public key and identification information associated with the authorized entity may have been issued exclusively to the authorized entity by a Certificate Authority, such as a globally accepted certificate authority (e.g., like Verisign, Inc.).

As explained above, the Sandbox Manager 134 may launch a virtualized application file (e.g., the executable virtualized application file 140, the xlayer file 300, and the like). Some virtualized application files (e.g., the xlayer file 300) are launched by the virtual runtime engine 131 (implemented by one of the virtual machine files 188 illustrated in FIG. 5), which is launched by the Sandbox Manager 134. Thus, in some implementations, the Sandbox Manager 134 may be characterized as launching the virtualized application file via the virtual runtime engine 131.

Access to a virtual application may be restricted by restricting the ability to launch virtualized application files to only authorized applications (e.g., the Sandbox Manager 134). Any application capable of performing the launching function may be signed using a signing algorithm and the private key associated with the authorized entity providing the managed distribution environment for the virtualized application file. Thus, applications capable of performing the launching function may include a digital signature. The virtual application or the virtual runtime engine 131 may condition execution of the virtualized application file on whether the digital signature is valid and associated with the authorized entity that provides, at least in part, the managed distribution environment for the virtualized application file.

The digital signature may be included in an executable of the authorized application created by a build process. During the build process, the executable may be signed using a signing algorithm and the private key associated with the authorized entity. A certificate signing tool (e.g., signtool.exe developed by Microsoft Corporation) may be used to create the digital signature. The public key certificate associated with the authorized entity may also be included in or associated with the executable of the authorized application.

FIG. 7 is a flow diagram of a method 500 performed by a virtual application implemented by a virtualized application file (e.g., the virtualized application file 140) or the virtual runtime engine 131 (see FIG. 5) executing a virtualized application file (e.g., the xlayer file 300 illustrated in FIG. 2). For ease of illustration, the method 500 is described below as being performed by the virtual runtime engine 131 (see FIG. 5). However, in alternate embodiments, the method 500 may be performed by one or more virtual runtime engine components implemented by the virtualized application file 140 (see FIG. 2).

Non-limiting example implementations of portions of the method 500 are provided below using pseudo code. In the pseudo code provided below, function calls preceded by "::" are calls to actual Windows APIs provided in a pseudo-code format.

Referring to FIG. 5, the Sandbox Manager 134 may begin execution of the virtual runtime engine 131 and instruct the virtual runtime engine 131 to begin executing the virtualized application file. In such implementations, the Sandbox Manager 134 is a parent process with respect to the virtual runtime engine 131 which is executing the virtualized application file.

Returning to FIG. 7, in first block 505, the virtual runtime engine 131 is launched. In block 505, the virtual runtime engine 131 may be launched by a launching application (e.g., the Sandbox Manager 134). In such implementations, the launching application is the parent process of the launched virtual runtime engine 131, which begins executing as a child process.

While the method 500 is described as being for use with a virtualized application file, the method 500 may be used for other application files that are launched by a launching application and execute as a child processes of the launching application.

In block 510, the virtual runtime engine 131 reads the configuration information of the virtualized application file (e.g., the configuration data 122 of the xlayer file 300 illustrated in FIG. 2). Among other settings, the configuration information includes the DRM indicator that indicates whether to check a digital signature (using a public key certificate) associated with the parent process (e.g., the Sandbox Manager 134). The value of the DRM indicator may be recorded during reading of the configuration information to be accessed by this process later.

Then, in decision block 520, the virtual runtime engine 131 determines whether the value of the DRM indicator indicates a digital signature associated with the parent process is to be validated. The decision in decision block 520 is "YES" when the value of the DRM indicator indicates a digital signature associated with the parent process is to be validated. On the other hand, the decision in decision block 520 is "NO" when the value of the DRM indicator indicates a digital signature associated with the parent process is not to be validated.

When the decision in decision block 520 is "NO," in block 530, the virtual runtime engine 131 executes the virtualized application file. Thus, when the value of the DRM indicator indicates a digital signature associated with the parent process is not to be validated, the virtual application will always run. The following pseudo code provides a non-limiting example of an implementation of decision block 520 and what occurs when the decision in decision block 520 is "NO."

```
// Should I Check My Parent Process?
if (checkParentProcessFlag == FALSE)
   goto RunApplication;
```

In the pseudo code above, the value of the DRM indicator read from the virtualized application file is stored in a Boolean variable named "checkParentProcessFlag." If the value of the checkParentProcessFlag variable is "FALSE," the virtualized application file is executed by a function named "RunApplication."

When the decision in decision block 520 is "YES," in decision block 540, the virtual runtime engine 131 determines whether it has a parent process.

The decision in decision block 540 is "YES" when the virtual runtime engine 131 has a parent process. Otherwise, the decision in decision block 540 is "NO" when the virtual runtime engine 131 does not have a parent process. When the decision in decision block 540 is "NO," in optional block 550, the virtual runtime engine 131 displays an error. Next, in block 560, the virtual runtime engine 131 terminates execution of the virtualized application file. Then, the method 500 terminates. The following pseudo code provides a non-limiting example of an implementation of decision block 540 and optional block 550.

```
// Do I Have a Parent Process?
currentProcessId = : :GetCurrentProcess ( );
currentProcessHandle = : :OpenProcess (currentProcessId);
: :NtQueryinformationProcess (currentProcessHandle,
                                  out processInfo);
parentProcessId = processInfo.InheritedFromUniqueProcessId;
parentProcessHandle = : :OpenProcess (parentProcessId);
if (IS_INVALID_HANDLE (parentProcessHandle))
   goto DisplayError;
```

In the above pseudo code, a variable named "parentProcessHandle" stores a handle to a parent process (e.g., the Sandbox Manager 134) of the current process (e.g., the virtual runtime engine 131). If the current process does not have a parent process, the variable named "parentProcessHandle" stores a value that is not a valid process handle. If a function named "IS_INVALID_HANDLE" is called with the value stored in the variable named "parentProcessHandle" and returns "TRUE," the virtual runtime engine 131 does not have a parent process and an error message is displayed by calling a function named "DisplayError." Otherwise, if the function named "IS_INVALID_HANDLE" returns "FALSE," the virtual runtime engine 131 has a parent process.

When the decision in decision block 540 is "YES," in decision block 570, the virtual runtime engine 131 determines whether the parent process has an associated digital signature. The decision in decision block 570 is "YES" when the parent process is associated with a digital signature. On the other hand, the decision in decision block 570 is "NO" when the parent process is not associated with a digital signature. When the decision in decision block 570 is "NO," in optional block 550, the virtual runtime engine 131 displays an error. Next, in block 560, the virtual runtime engine 131 terminates execution of the virtualized application file. Then, the method 500 terminates. The following pseudo code provides a non-limiting example of an implementation of decision block 570 and optional block 550.

```
// Is My Parent Process Signed?
: :GetProcessImageFileName (parentProcessHandle,
                                out parentProcessFilename);
status = : :CryptQueryObject (parentProcessFilename,
                                out message);
if (IS_ERROR (status))
    goto DisplayError;
```

In the above pseudo code, the handle to the parent process (obtained by the pseudo code implementing decision block 540) is used to obtain the file name of a file implementing the parent process. For example, if the handle to the parent process is the Sandbox Manager 134, and the Windows API function named "GetProcessImageFileName" is called with the handle to the parent process, the function named "GetProcessImageFileName" will set the value of an output parameter (e.g., an output parameter named "parentProcessFilename") to the file name of the executable file storing the instructions implementing the parent process. A call to a Windows API function named "CryptQueryObject" is used to retrieve information about the contents of a digital signature stored in the executable file implementing the parent process. The function named "CryptQueryObject" returns an error value (e.g., zero) if the file does not contain a digital signature. Otherwise, the function named "CryptQueryObject" returns a value indicating an error has not occurred (e.g., a value other than zero). A function named "IS_ERROR" is used to determine whether the function named "CryptQueryObject" returned an error value. If an error value was returned, the function named "DisplayError" is called to display the error.

When the decision in decision block 570 is "YES," in decision block 580, the virtual runtime engine 131 determines whether the digital signature stored in the executable file implementing the parent process is associated with the authorized entity. The executable file implementing the parent process may include an entity identifier that identifies an entity that created the executable file implementing the parent process or is otherwise associated with the parent process. The entity identifier may be included in a copy of the public key certificate included in the executable file implementing the parent process. The entity identifier may compared to a predetermined value associated with the authorized entity to determine whether the executable file implementing the parent process is associated with the authorized entity. If the entity identifier matches the predetermined value associated with the authorized entity, the digital signature stored in the executable file implementing the parent process is associated with the authorized entity. Otherwise, if the entity identifier fails to match the predetermined value associated with the authorized entity, the digital signature stored in the executable file implementing the parent process is not associated with the authorized entity. The decision in decision block 580 is "YES" when the digital signature stored in the executable file implementing the parent process is associated with the authorized entity. On the other hand, the decision in decision block 580 is "NO" when the digital signature stored in the executable file implementing the parent process is not associated with the authorized entity.

As explained above, the digital signature is created using the private key associated with the authorized entity. The public key certificate is used to determine whether the digital signature is associated with the authorized entity. A copy of the public key certificate may be stored in the executable file implementing the parent process. Alternatively, the virtual runtime engine 131 may include a copy of the public key certificate.

When the decision in decision block 580 is "NO," in optional block 550, the virtual runtime engine 131 displays an error. Next, in block 560, the virtual runtime engine 131 terminates execution of the virtualized application file. Then, the method 500 terminates. The following pseudo code provides a non-limiting example of an implementation of decision block 580 and optional block 550.

```
// Is My Parent Process Signed by authorized entity?
: :CryptMsgGetParam (message, out signerInfo);
: :CertFindCertificateInStore (signerInfo, out certInfo,
                                out certContext);
: :CertGetNameString (certInfo, out certName);
if (certName != CodeSystemsCertName)
    goto DisplayError;
```

In the pseudo code above, the virtual runtime engine 131 calls the Windows API function named "CryptMsgGetParam" to obtain information related to a signer of the digital signature. This information is stored by the function named "CryptMsgGetParam" in an output parameter named "signerInfo." A function named "CertFindCertificateInStore" is used to locate information stored in the public key certificate associated with the information stored in the parameter named "signerInfo." The information stored in the public key certificate is stored in an output parameter named "certInfo." Then, a Windows API function named "CertGetNameString" is called using the parameter named "certInfo" to obtain the name of the signer from the public key certificate, which is stored in an output parameter named "certName." If the name of the signer is not equal to the name of the authorized entity (e.g., a value stored in a variable named "CodeSystemsCertName"), the function named "DisplayError" is called to display the error.

When the decision in decision block 580 is "YES," in decision block 590, the virtual runtime engine 131 determines whether the digital signature stored in the executable file implementing the parent process is valid. The digital signature may determined by encrypting a value using the private key. The value that is to be encrypted is determined based on the executable file implementing the parent process. For example, the value may be a result of a function (e.g., a hash function) performed on the executable file implementing the parent process or a portion thereof. As is apparent to those of ordinary skill in the art, validity of the digital signature may be determined by decrypting the digital signature using the public key. The decrypted digital signature may be compared to a second value determined using the same function performed on the executable file implementing the parent process that was used to create the value encrypted in the digital signature. If the decrypted digital signature matches the second value, the digital signature is valid. On the other hand, if the decrypted digital signature does not match the second value, the digital signature is invalid. The decision in decision block 590 is "YES" when the digital signature stored in the executable file implementing the parent process is valid. The decision in decision block 590 is "NO" when the certificate stored in the executable file implementing the parent process is invalid.

When the decision in decision block 590 is "NO," in optional block 550, the virtual runtime engine 131 displays an error. Next, in block 560, the virtual runtime engine 131 terminates execution of the virtualized application file. Then, the method 500 terminates.

When the decision in decision block 590 is "YES," the virtual runtime engine 131 advances to block 530 whereat the virtual runtime engine 131 executes the virtualized application file.

The following pseudo code provides a non-limiting example of an implementation of decision block 580, optional block 550, and block 530.

```
// Is the Certificate Chain Valid?
::CertGetCertificateChain (certContext, out chainContext);
if (IS_UNTRUSTED_CERTIFICATE_CHAIN (chainContext))
    goto DisplayError;
else
    goto RunApplication;
```

In the pseudo code above, the virtual runtime engine 131 calls the Windows API function named "CertGetCertificateChain" to build a certificate chain context starting from an end certificate (a variable named "certContext" stores a pointer to the end of the certificate) and going back, if possible, to a trusted root certificate. A pointer to the certificate chain context is stored in an output parameter named "chainContext."

A function named "IS_UNTRUSTED_CERTIFICATE_CHAIN" is used to determine whether the certificate chain context is invalid. If the certificate chain context is invalid, the function named "IS_UNTRUSTED_CERTIFICATE_CHAIN" returns "TRUE" and the function named "DisplayError" is called to display the error. Otherwise, if the certificate chain context is valid, the function named "IS_UNTRUSTED_CERTIFICATE_CHAIN" returns "FALSE" and the function named "RunApplication" is called to execute the virtualized application file.

As is apparent to those of ordinary skill, in block 580 and/or block 590, the digital signature of the public key certificate may be validated using the public key certificate of the Certificate Authority to confirm that the identity information stored in the public key certificate associated with the authorized entity is valid.

When the virtual runtime engine 131 finishes executing the virtualized application file (in block 530), the method 500 terminates.

In the method 500, when the value of the DRM indicator indicates a digital signature associated with the parent process is to be validated (the decision in decision block 520 is "YES"), the virtual runtime engine 131 will try to validate a digital signature associated with the parent process at runtime and will continue executing the virtualized application file only if the digital signature is valid. If the digital signature is invalid, the virtual runtime engine 131 will terminate execution of the virtualized application file. The method 500 may be characterized as implementing certificate-based DRM.

Restricting Launch Using Session Tickets

Figure 8:
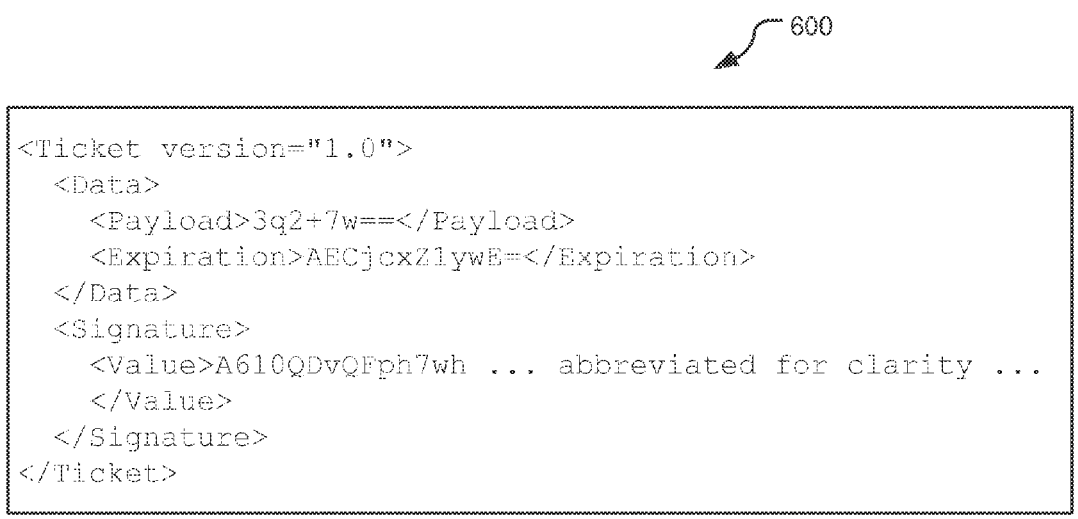
FIG. 8 is an exemplary pseudo code implementation of a session ticket.

With the security mechanisms implemented by the method 500, it may still be possible for an unauthorized party to send signals to a "certified application" (e.g., the Sandbox Manager 134) that will cause the certified application to launch virtualized application files (e.g., via the virtual runtime engine 131) on behalf of the unauthorized party. Referring to FIG. 8, this may be avoided by requiring a valid session ticket 600 whenever the virtualized application file is launched. Methods of using the session ticket 600 to restrict launch of the virtualized application file (e.g., a method 605 described below and illustrated in FIG. 9) may be characterized as implementing ticket-based DRM. Ticket-based DRM may be used in addition to or instead of certificate-based DRM.

The session ticket 600 may be implemented as a XML blob storing an expiration date. By way of a non-limiting example, the session ticket 600 may be implemented as a custom XML document designed to be parsed by both .NET languages as well as low-level C++ code, which may have limited access to libraries implementing more rich XML-based digital signatures (commonly referred to as "XMLDSIGs").

The session ticket 600 may be signed using a signing algorithm and the private key associated with the authorized entity tasked with providing, at least in part, a managed distribution environment for the virtualized application file (e.g., the virtualized application file 140, the xlayer file 300, and the like). Thus, a digital signature may be associated with the session ticket 600. The public key and private key used to implement the session ticket 600 may both be generated by the authorized entity. The virtual runtime engine 131 may include the public key so that the public key need not be included in the virtualized application file or passed to the virtual runtime engine 131. Thus, a public key certificate is not required to validate the session ticket 600. The digital signature and the public key are used to determine whether the session ticket 600 is associated with the authorized entity.

If the digital signature is invalid (as determined using the public key), or launch is initiated after the expiration date stored by the session ticket 600, the Sandbox Manager 134 and/or the virtual runtime engine 131 will not launch the virtual application file.

FIG. 8 provides a non-limiting example of a format that may be used to implement the session ticket 600. The session ticket 600 includes two elements: a "Data" element (starting at a start tag "<Data>" and ending with an end tag "</Data>"); and a "Signature" element (starting at a start tag "<Signature>" and ending with an end tag "</Signature>").

The "Data" element includes a "Payload" field and an "Expiration" field. Between a start tag "<Payload>" and an end tag "</Payload>," the "Payload" field stores an application defined payload (e.g., data). By way of a non-limiting example, the application defined payload may be implemented as an opaque blob of bytes converted to a base64 string within the XML. Between a start tag "<Expiration>" and an end tag "</Expiration>," the "Expiration" field stores an expiration date. By way of a non-limiting example, the "Expiration" field may be implemented as a Windows FILETIME variable converted first into raw 8-bytes and then into a base64 string within the XML. The expiration date may be formatted as a Coordinated Universal Time ("UTC") value. The fields stored in the "Data" element may be signed so that they will be tamper resistant.

The "Signature" element includes a "Value" field and may optionally include other fields (not shown). Between a start tag "<Value>" and an end tag "</Value>," the "Value" field stores the digital signature. The digital signature is determined by encrypting a value using the private key. By way of a non-limiting example, the value that is encrypted may be determined as a function (e.g., a hash function) of the "Data" element of the session ticket 600 or a portion thereof. For example, the value that is encrypted may be determined based on the "Payload" field and/or the "Expiration" field of the session ticket 600.

Due to the nature of asymmetric cryptography, it is believed to be cryptographically "impossible" to create the session ticket 600 without the private key. Thus, by validating the digital signature stored in the "Value" field of the "Signature" element, one can establish that the session ticket 600 was created by the authorized entity (e.g., operating the server computing device 6 illustrated in FIG. 1).

While the method 605 is described below as being for use with a virtualized application file, the method 605 may be used for other application files.

Figure 9:
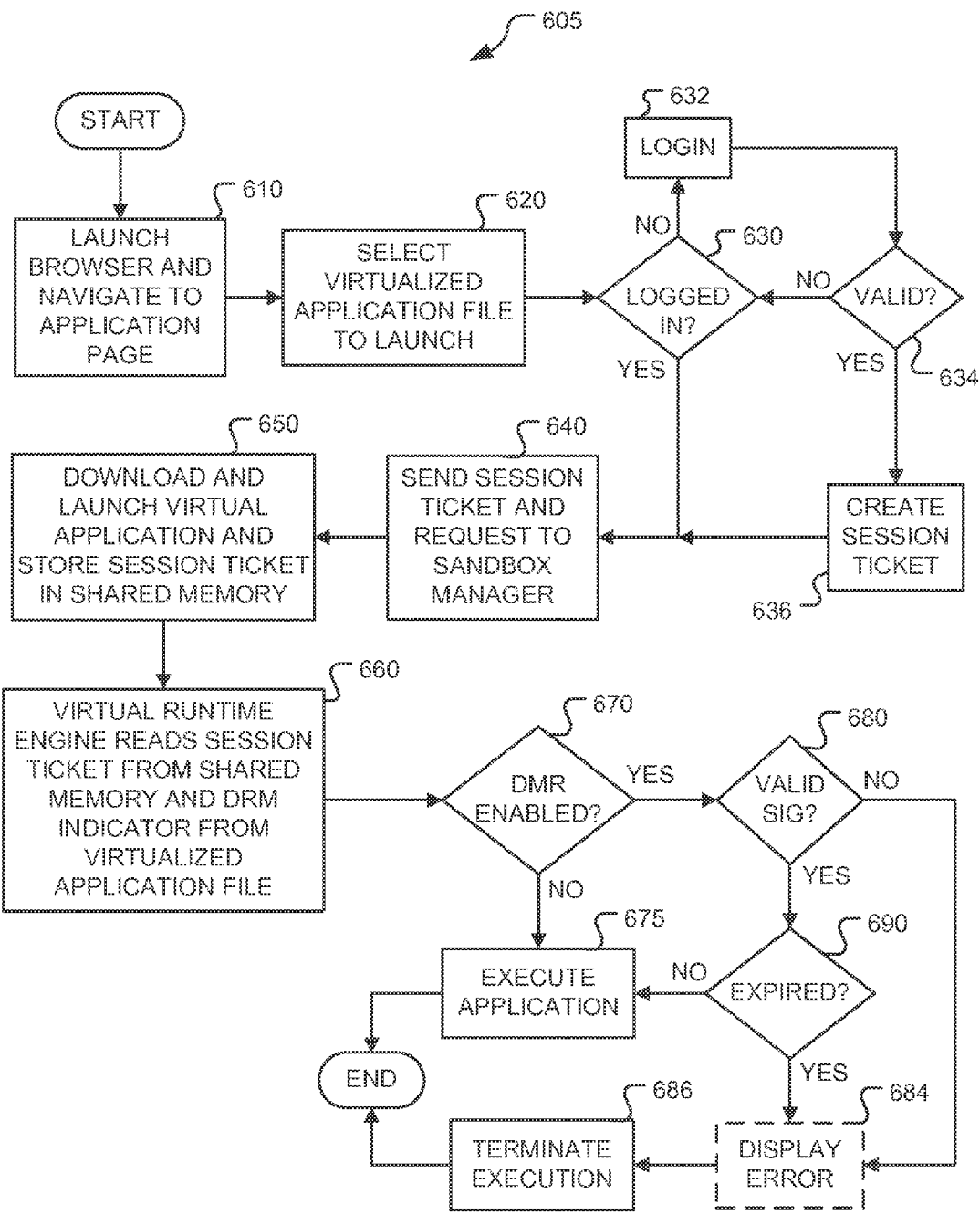
FIG. 9 is a flow diagram of a method of restricting execution of the published file to an authorized user having a valid and unexpired session ticket.

FIG. 9 is a flow diagram of the method 605 performed by the system 5 (see FIG. 1). In first block 610, a user launches a browser and navigates to the website 190 illustrated in FIG. 6. The server computing device 6 (see FIG. 1) generates a web page with links 612 or other selectable inputs that may be selected by the user. The server computing device 6 may query the Application Library Database 14 (see FIG. 1) and use the results of the query to generate the web page 198. Then, returning to FIG. 9, in block 620, the user selects a virtualized application file (e.g., the virtualized application file 140, the xlayer file 300, and the like) to download and execute. Also in block 620, the server computing device 6 receives this selection.

In block 630, the server computing device 6 determines whether the user is logged into a user account. The decision in decision block 630 is "YES" when the user is logged into a user account. On the other hand, the decision in decision block 630 is "NO" when the user is not logged into a user account.

When the decision in decision block 630 is "NO," in block 632, the user enters login information that is received by the server computing device 6. If user is not currently logged in, a login prompt is presented to the user allowing the user to enter their account information. The account information is submitted to the server computing device 6.

In decision block 634, the server computing device 6 determines whether the user entered valid account information. In decision block 634, the account information entered by the user may be validated on a trusted backend server (not shown). Further, the account information may be validated by querying the Account Database 13. The decision in decision block 634 is "YES" when the user has entered valid account information. On the other hand, the decision in decision block 634 is "NO" when the user has entered invalid account information.

When the decision in decision block 634 is "NO," the server computing device 6 returns to decision block 630.

When the decision in decision block 634 is "YES," in block 636, a login session is created. In block 636, the session ticket 600 is also created. Information related to the login session may be wrapped in the session ticket. The information related to the login session may be implemented as a BYTE-blob passed as a payload to the session ticket 600. In other words, the information related to the login session may be stored in the "Payload" field of the session ticket 600.

When the decision in decision block 630 is "YES," the session ticket 600 was created previously when the user logged onto a valid user account.

The following pseudo code provides a non-limiting example of a method of creating the session ticket 600.

```
XmlDocument CreateTicket (DateTime dtExpiration)
{
    byte[ ] abPayload = _GeneratePayload ( );
```

-continued

```
    byte[ ] abSignature = CreateSignature (abPayload,
                                          dtExpiration,
                                          sPrivateKeyXml);
    return _CreateXmlDocument (abPayload, dtExpiration,
                                abSignature);
}
byte[ ] CreateSignature (byte [ ] abPayload,
                         DateTime dtExpiration,
                         string sPrivateKeyXml)
{
    using (RSACryptoServiceProvider rsa =
        new RSACryptoServiceProvider ())
    {
        rsa.FromXmlString (sPrivateKeyXml);
        byte[ ] abData = _ ConcatenateBlobs (abPayload,
                                              dtExpiration);
        return rsa.SignData (abData,
            new SHA1CryptoServiceProvider ( ));
    }
}
```

In block 640, the session ticket 600 is transmitted to the Sandbox Manager 134 (e.g., via the Client Application 132) along with a request to download and launch the virtualized application file selected in block 620. The session ticket 600 may be sent to the Sandbox Manager 134 as one or more parameters (e.g., command line parameters) sent with the launch request. As described in the U.S. patent application Ser. No. 12/695,107, other parameters may also be sent to the Sandbox Manager 134 along with the launch request.

In block 650, the Sandbox Manager 134 downloads and launches the virtualized application file selected in block 620, and stores the session ticket 600 in one or more fields 135 within the block of shared memory 133 illustrated in FIG. 5. The following pseudo code provides a non-limiting example of a data structure named "SSessionInfo" that may be used to implement the block of shared memory 133 including the fields 135 configured to store the session ticket 600.

```
// Shared memory structure from sandman process
// representing application session
struct SSessionInfo
{
    DWORD fStartup;              // ESessionStartupFlaqs
    DWORD cbBlockSize;
    ULONG hEvtPulse;             // <-- Using ULONG to be 32-bit
                                 // compat with sandman.
    DWORD fState;                // ESessionStates
    WCHAR awcMsgBoxTitle [MAXMESSAGEBOXTITLESIZE] ; // title
                                 // given to any error message box
    ULONG aMsg [MAXREQUIREDMESSAGES] ; // Array of required
                                 // messages.
    *** NEW FIELDS 135 BEGIN HERE ***
    // Session ticket
    ULONG cwcSessionTicket;      // count of WCHARs in
                                 // Session Ticket
    ULONG oSessionTicket;        // byte offset from start of this
                                 // structure to start of ticket
    //BYTE [ ] Data;             // All dynamic sized data goes here
};
```

Returning to FIG. 9, in block 660, the virtual runtime engine 131 reads the session ticket 600 from the block of shared memory 133 and stores the session ticket in a string variable. In block 660, the virtual runtime engine 131 also reads the DRM indicator from the loaded configuration information of the virtualized application file (e.g., the configuration data 122 of the xlayer file 300 illustrated in FIG. 2). As explained above, the loaded configuration information may be stored in a virtual application configuration file.

In decision block 670, the virtual runtime engine 131 determines whether the value of the DRM indicator indicates the value in the "Signature" element of the session ticket 600 is to be validated. The decision in decision block 670 is "YES" when the value of the DRM indicator indicates the value in the "Signature" element of the session ticket 600 is to be validated. On the other hand, the decision in decision block 670 is "NO" when the value of the DRM indicator indicates the value in the "Signature" element of the session ticket 600 is not to be validated.

When the decision in decision block 670 is "NO," in block 675, the virtual runtime engine 131 executes the virtualized application file. When execution of the virtualized application file has finished, the method 605 terminates.

When the decision in decision block 670 is "YES," in decision block 680, the virtual runtime engine 131 determines whether the value in the "Signature" element of the session ticket 600 is valid. As is apparent to those of ordinary skill in the art, the virtual runtime engine 131 may determine the validity of the digital signature stored by the "Signature" element by decrypting the digital signature using the public key. As discussed above, the virtual runtime engine 131 may include a copy of the public key associated with the authorized entity. As also discussed above, the digital signature may be created by encrypting a value using the private key. By way of a non-limiting example, the value that is encrypted may be determined as a function (e.g., a hash function) of the "Data" element of the session ticket 600 or a portion thereof. The decrypted digital signature may be compared to a second value determined using the same function of the "Data" element (or a portion thereof) used to create the value encrypted in the digital signature. For example, the value encrypted to create the digital signature may have been determined as a function of the "Payload" field and/or the "Expiration" field. In this example, the second value is determined using the same function of the "Payload" field and/or the "Expiration" field. If the decrypted digital signature matches the second value, the digital signature is valid. On the other hand, if the decrypted digital signature does not match the second value, the digital signature is invalid. A valid session ticket originated from the authorized entity. An invalid session ticket did not originate from the authorized entity. The decision in decision block 680 is "YES" when the value in the "Signature" element of the session ticket 600 is valid. On the other hand, the decision in decision block 680 is "NO" when the value in the "Signature" element of the session ticket 600 is invalid.

When the decision in decision block 680 is "NO," in optional block 684, the virtual runtime engine 131 displays an error. Next, in block 686, the virtual runtime engine 131 terminates execution of the virtualized application file. Then, the method 605 terminates.

When the decision in decision block 680 is "YES," in decision block 690, the virtual runtime engine 131 determines whether the session ticket 600 has expired. The decision in decision block 690 is "YES" when the session ticket 600 has expired. On the other hand, the decision in decision block 690 is "NO" when the session ticket 600 has not expired. The virtual runtime engine 131 determines whether the session ticket 600 has expired by comparing the value stored in the "Expiration" field of the "Data" element of the session ticket 600 to a current time. If the value stored in the "Expiration" field of the "Data" element of the session ticket 600 is after the current time, the virtual runtime engine 131 determines the session ticket 600 has not expired. Otherwise, if the value stored in the "Expiration" field of the "Data" element of the session ticket 600 is before the current time, the virtual runtime engine 131 determines the session ticket 600 has expired.

When the decision in decision block 690 is "YES," in optional block 684, the virtual runtime engine 131 displays an error. Next, in block 686, the virtual runtime engine 131 terminates execution of the virtualized application file. Then, the method 605 terminates.

When the decision in decision block 690 is "NO," in block 675, the virtual runtime engine 131 executes the virtualized application file. When execution of the virtualized application the has finished, the method 605 terminates.

The following pseudo code provides an exemplary implementation of decision blocks 680 and 690. The pseudo code below includes a function named "ValidateSessionTicket" that returns "TRUE" if the digital signature (stored in the "Signature" element of the session ticket 600) is valid and the session ticket has not yet expired. Otherwise, the function named "ValidateSessionTicket" returns "FALSE."

```
bool ValidateSessionTicket (LPCWSTR pwcsSessionTicketXml)
{
   BLOB bPayload;
   BLOB bExpiration;
   BLOB bSignature;
   _ExtractBlobFromSessionTicketXML (pwcsSessionTicketXml,
                                   OUT bPayload,
                                   OUT bExpiration,
                                   OUT bSignature);
   BLOB bUnifiedData = ConcatenateBlobs (bPayload,
                                        bExpiration);
   HANDLE hCrypto = CryptoInit (RSA);
   HANDLE hHash = CryptoHash (hCrypto, pUnifiedData);
   HANDLE hPublicKey = CryptoImbortKey (bPublicKey);
   bool fValid = CryptoVerifySignature (hHash, bSignature,
                                       hPublicKey);
   if (fValid)
   {
      FILETIME ftExpiration =
         ConvertBytesToFiletime (bExpiration);
      fValid = (ftExpiration > GetCurrentFiletimeGMT ( ));
   }
   // Cleanup handles
   return fValid;
}
```

Thus, when the value of the DRM indicator indicates the value in the "Signature" element of the session ticket 600 is to be validated, the session ticket is validated and the expiration date provided by the session ticket is checked against the current time. If session ticket 600 is valid and has not expired, the virtualized application file is allowed to execute.

Figure 6:
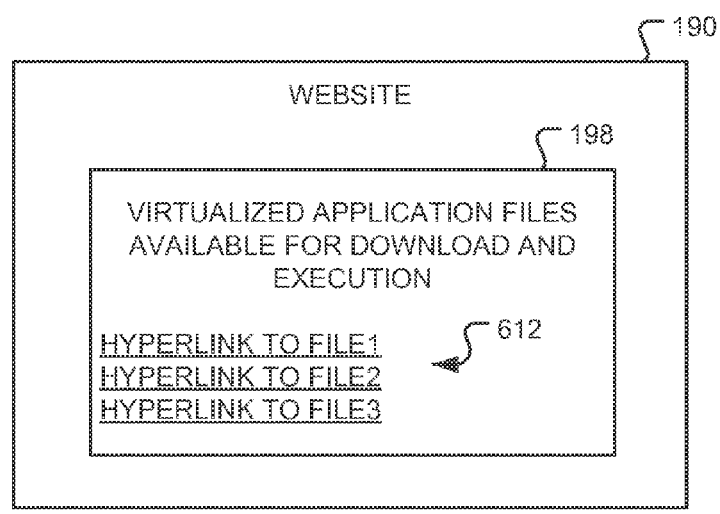
FIG. 6 is a block diagram of the website generated by the second server computing device of FIG. 4.

Session tickets may be used to require users to execute virtual application files from the website 190 illustrated in FIG. 6. Alternatively, until the session ticket 600 expires, the Sandbox Manager 134 may execute a locally stored copy of the virtual application file. However, the session ticket 600 may be configured to expire shortly after it is created to thereby restrict the launch of virtualized application file to within the managed distribution environment.

Computing Devices

Figure 10:
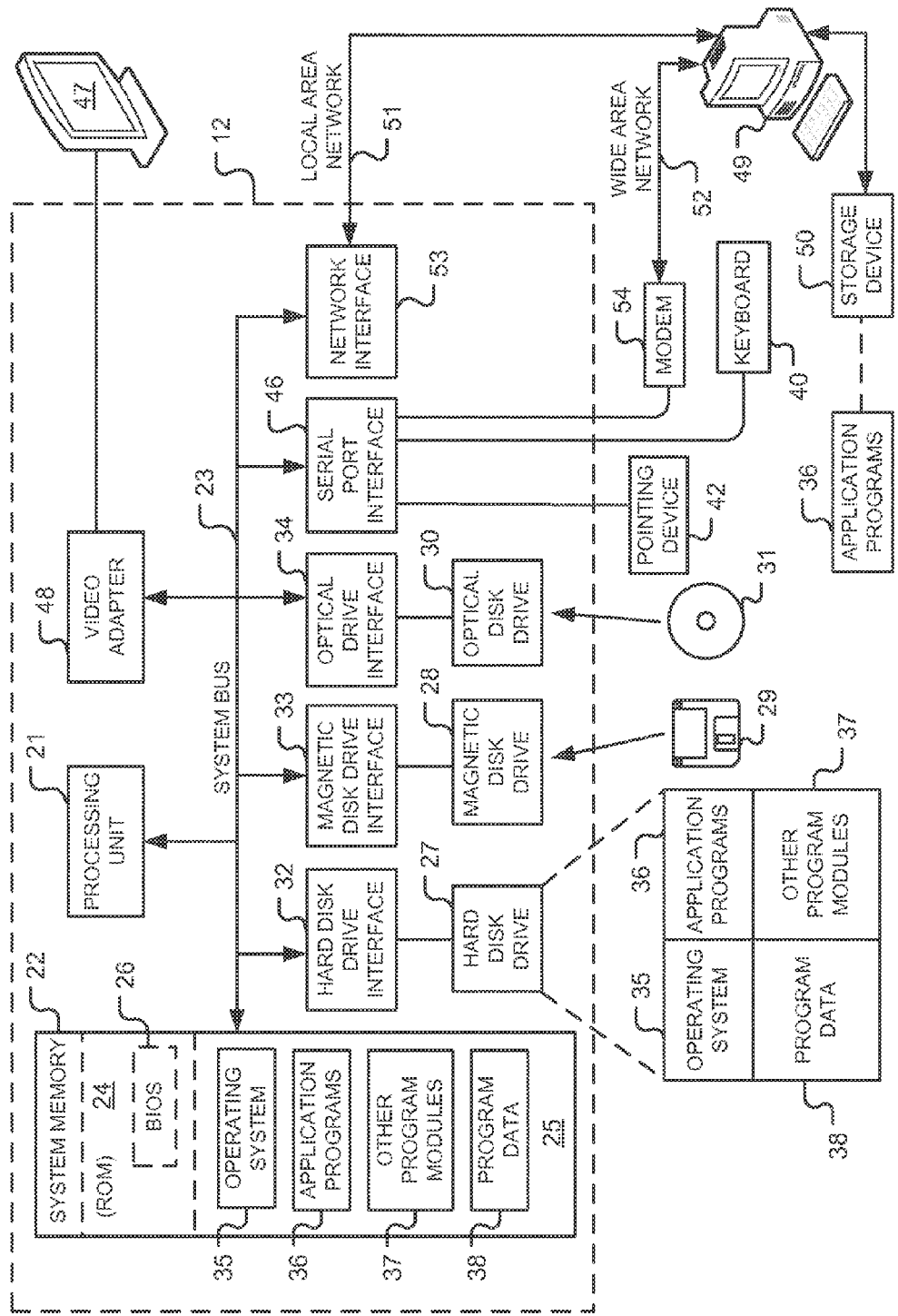
FIG. 10 is a diagram of a hardware environment and an operating environment in which one or more of the computing devices of the system of FIG. 1 may be implemented.

FIG. 10 is a diagram of hardware and an operating environment in conjunction with which implementations of the virtual application file 140, the xlayer file 300, the Client Application 132, the Sandbox Manager 134, the authoring tool 170 (including the wizard 174), the web server components 142A, the web server components 142B, the application library web services (implemented by the application library web services components 143 illustrated in FIG. 3), and/or the virtual runtime engine 131 may be practiced. The description of FIG. 10 is intended to provide a brief, general description of suitable computer hardware and a suitable computing environment in which implementations may be practiced. Although not required, implementations are described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that implementations may be practiced with other computer system configurations, including hand-held devices, multiprocessor systems, microprocessor-based or programmable consumer electronics, network PCs, minicomputers, mainframe computers, and the like. Implementations may also be practiced in distributed computing environments where tasks are performed by remote processing devices that are linked through a communications network. In a distributed computing environment, program modules may be located in both local and remote memory storage devices.

The exemplary hardware and operating environment of FIG. 10 includes a general-purpose computing device in the form of a computing device 12. Each of the virtual application file 140, the xlayer file 300, the Client Application 132, the Sandbox Manager 134, the authoring tool 170 (including the wizard 174), the web server components 142A, the web server components 142B, the application library web services (implemented by the application library web services components 143 illustrated in FIG. 3), and/or the virtual runtime engine 131 may be implemented using one or more computing devices like the computing device 12. By way of non-limiting example, the virtual application file 140, the xlayer file 300, the Client Application 132, the Sandbox Manager 134, the authoring tool 170 (including the wizard 174), the web server components 142A, the web server components 142B, the application library web services (implemented by the application library web services components 143 illustrated in FIG. 3), and/or the virtual runtime engine 131 may be implemented on the computing device 12. Further, each of the server computing device 6, the server computing device 7, the client computing device 9, the client computing device 11, the Account Database 13, and the Application Library Database 14 may be implemented by computing devices substantially similar to the computing device 12.

The computing device 12 includes the system memory 22, a processing unit 21, and a system bus 23 that operatively couples various system components, including the system memory 22, to the processing unit 21. There may be only one or there may be more than one processing unit 21, such that the processor of computing device 12 comprises a single central-processing unit (CPU), or a plurality of processing units, commonly referred to as a parallel processing environment. The computing device 12 may be a conventional computer, a distributed computer, or any other type of computer.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computing device 12, such as during start-up, is stored in ROM 24. The computing device 12 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules, and other data for the computing device 12. It should be appreciated by those skilled in the art that any type of computer-readable media which can store data that is accessible by a computer, such as magnetic cassettes, flash memory cards, USB drives, digital video disks, Bernoulli cartridges, random access memories (RAMs), read only memories (ROMs), and the like, may be used in the exemplary operating environment. As is apparent to those of ordinary skill in the art, the hard disk drive 27 and other forms of computer-readable media (e.g., the removable magnetic disk 29, the removable optical disk 31, flash memory cards, USB drives, and the like) accessible by the processing unit 21 may be considered components of the system memory 22.

A number of program modules may be stored on the hard disk drive 27, magnetic disk 29, optical disk 31, ROM 24, or RAM 25, including an operating system 35, one or more application programs 36, other program modules 37, and program data 38. A user may enter commands and information into the computing device 12 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus 23, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The input devices described above are operable to receive user input and selections. Referring to FIG. 6, the display device is operable to display the web page 198 and other web pages generated by the server computing device 6 illustrated in FIG. 1. Together the input and display devices may be described as providing a user interface.

Returning to FIG. 10, the computing device 12 may operate in a networked environment using logical connections to one or more remote computers, such as remote computer 49. These logical connections are achieved by a communication device coupled to or a part of the computing device 12 (as the local computer). Implementations are not limited to a particular type of communications device. The remote computer 49 may be another computer, a server, a router, a network PC, a client, a memory storage device, a peer device or other common network node, and typically includes many or all of the elements described above relative to the computing device 12. The remote computer 49 may be connected to a memory storage device 50. The logical connections depicted in FIG. 10 include a local-area network (LAN) 51 and a wide-area network (WAN) 52. Such networking environments are commonplace in offices, enterprise-wide computer networks, intranets and the Internet.

When used in a LAN-networking environment, the computing device 12 is connected to the local area network 51 through a network interface or adapter 53, which is one type of communications device. When used in a WAN-networking environment, the computing device 12 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computing device 12, or portions thereof, may be stored in the remote computer 49 and/or the remote memory storage device 50. It is appreciated that the network connections shown are exemplary and other means of and communications devices for establishing a communications link between the computers may be used.

The computing device 12 and related components have been presented herein by way of particular example and also by abstraction in order to facilitate a high-level view of the concepts disclosed. The actual technical design and implementation may vary based on particular implementation while maintaining the overall nature of the concepts disclosed.

Returning to FIGS. 2-5, the system memory 22A, the system memory 22B, the system memory 22C, and the system memory 22D may each be substantially similar to the system memory 22. Thus, the host operating system 35A, the host operating system 35B, the host operating system 350, the host operating system 35D, the virtual application file 140, the xlayer file 300, the Client Application 132, the Sandbox Manager 134, the authoring tool 170 (including the wizard 174), the web server components 142A, the web server components 1423, the application library web services (implemented by the application library web services components 143 illustrated in FIG. 3), and/or the virtual runtime engine 131 may be stored as computer executable components on the system memory 22A, 223, 22C, and/or 22D. Each of the host operating system 35A, the host operating system 353, the host operating system 35C, the host operating system 35D, the virtual application file 140, the xlayer file 300, the Client Application 132, the Sandbox Manager 134, the authoring tool 170 (including the wizard 174), the web server components 142A, the web server components 142B, the application library web services (implemented by the application library web services components 143 illustrated in FIG. 3), and/or the virtual runtime engine 131 may be implemented using software components that are executable by the processing unit 21 and when executed perform the functions described above. Further, the methods 500 and 605 may each be implemented as computer executable instructions that are executable by the processing unit 21. Such instructions may be encoded on one or more non-transitory computer-readable mediums for execution by one or more processing units.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A computer-implemented method for use with a launching application and a separate runtime engine, the launching application and the runtime engine being configured to access a shared memory location, the method comprising:
   at the launching application, receiving a first instruction to execute a virtualized application file and a ticket, the ticket comprising a digital signature and an expiration date;
   at the launching application, storing the ticket in the shared memory location and sending a second instruction to the runtime engine instructing the runtime engine to execute the virtualized application file; and
   in response to the second instruction received from the launching application, at the runtime engine, reading the ticket from the shared memory location, determining whether the digital signature is valid, determining whether the ticket has expired, and executing the virtualized application file only when the runtime engine determines the ticket is valid and has not yet expired, whether the ticket is valid being determined based on the digital signature, and whether the ticket has expired being determined based on the expiration date.

2. The computer-implemented method of claim 1 for use with the runtime engine comprising a public key, wherein whether the ticket is valid is determined based on the digital signature and the public key.

3. The computer-implemented method of claim 1 for use with the launching application connected to a server computing device via the Internet, wherein the first instruction to execute the virtualized application file and the ticket are both received by the launching application from the server computing device via the Internet.

4. The computer-implemented method of claim 3, further comprising:
at the launching application, receiving a third instruction to at least partially download the virtualized application file.

5. A computer-implemented method for use with a virtualized application file, and a shared memory location storing a ticket comprising a digital signature and an expiration date, the virtualized application file comprising a digital rights management indicator, the method comprising:
receiving an instruction to execute the virtualized application file from a launching application that stored the ticket in the shared memory location;
in response to the instruction, reading the ticket from the shared memory location and reading the digital rights management indicator from the virtualized application file;
when the digital rights management indicator indicates the ticket is to be validated, determining whether the digital signature is valid, determining whether the ticket has expired, and executing the virtualized application file only when the ticket is determined to be valid and not yet expired, whether the ticket is valid being determined based on the digital signature, and whether the ticket has expired being determined based on the expiration date; and
when the digital rights management indicator indicates the ticket is not to be validated, executing the virtualized application file.

6. The computer-implemented method of claim 5 further comprising:
obtaining a public key, wherein whether the ticket is valid is determined based on the digital signature and the public key.

7. The computer-implemented method of claim 5, further comprising:
when the ticket is determined to be one of invalid or expired, displaying an error message.

8. A computer-implemented method for use with a remote computing device operated by a user, the remote computing device implementing a launching application and a separate runtime engine, the method comprising:
instructing the remote computing device to display a plurality of selectable options, each option corresponding to an application file, wherein the application file is a virtualized application file;
receiving a selection of one of the plurality of selectable options from the remote computing device;
determining whether the user operating the remote computing device has logged into a user account;
when the user has not logging into a user account, instructing the remote computing device to display a login display, receiving login information from the remote computing device via the login display, and determining whether the login information is valid;
when the login information is valid, creating a login session;
creating a ticket comprising a digital signature and an expiration date, creating the ticket comprising incorporating information related to the login session into the ticket;
instructing the launching application on the remote computing device to launch the application file corresponding to the selected one of the plurality of selectable options; and
transmitting the ticket to the launching application, the launching application being operable to communicate the ticket to the runtime engine, the runtime engine being operable to execute the application file corresponding to the selected one of the plurality of selectable options in response to an instruction to do so only when the digital signature of the ticket is valid and a current date is not later than the expiration date.

9. The computer-implemented method of claim 8, further comprising:
downloading the application file corresponding to the selected one of the plurality of selectable options to the remote computing device.

10. The computer-implemented method of claim 8, wherein the application file corresponding to the selected one of the plurality of selectable options was stored on the remote computing device before the remote computing device is instructed to display the plurality of selectable options.

* * * * *